(12) United States Patent
Girouard et al.

(10) Patent No.: US 9,394,014 B2
(45) Date of Patent: Jul. 19, 2016

(54) FRONT TRACK ASSEMBLY FOR A SNOWMOBILE

(71) Applicant: BOMBARDIER RECREATIONAL PRODUCTS INC., Valcourt (CA)

(72) Inventors: Bruno Girouard, Shefford (CA); Vincent Tognon, Racine (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/577,075

(22) Filed: Dec. 19, 2014

(65) Prior Publication Data

US 2015/0101872 A1    Apr. 16, 2015

Related U.S. Application Data

(63) Continuation-in-part of application No. 14/351,266, filed as application No. PCT/US2012/059903 on Oct. 12, 2012, now Pat. No. 9,022,155.

(60) Provisional application No. 61/919,665, filed on Dec. 20, 2013, provisional application No. 61/546,239, filed on Oct. 12, 2011.

(51) Int. Cl.
*B62D 55/08*    (2006.01)
*B62M 27/02*    (2006.01)
*B62D 55/065*    (2006.01)
(Continued)

(52) U.S. Cl.
CPC  *B62D 55/08* (2013.01); *B60G 3/20* (2013.01); *B60T 8/26* (2013.01); *B62D 55/065* (2013.01); *B62L 1/00* (2013.01); *B62M 27/02* (2013.01); *F16D 55/22* (2013.01); *F16D 65/18* (2013.01);

*B60G 2200/144* (2013.01); *B60G 2300/32* (2013.01); *B60G 2300/322* (2013.01); *B62M 2027/027* (2013.01)

(58) Field of Classification Search
CPC ....... B62D 55/08; B62D 55/10; B62D 55/244
USPC .......................................... 305/9
See application file for complete search history.

(56) References Cited

U.S. PATENT DOCUMENTS 3,568,786 A * 3/1971 Harsch .................. B62M 27/02
                                                    180/190
3,684,044 A   8/1972 Watson
(Continued)

FOREIGN PATENT DOCUMENTS

GB         2052407 A    1/1981

OTHER PUBLICATIONS

International Search Report of PCT/US2012/059903, Jan. 2, 2013, Lee W. Young.

*Primary Examiner* — Kevin Hurley
(74) *Attorney, Agent, or Firm* — BCF LLP

(57) ABSTRACT

A track assembly for a vehicle has an endless track having a belt disposed on an inner side thereof, a frame member, a first axle connected to the frame member and disposed at least in part inside the track, a first pulley disposed inside the endless track and mounted to the first axle, the first pulley being rotatable relative to the frame member, the belt being received in part inside the first pulley, a second axle connected to the frame member and disposed at least in part inside the track, a second pulley disposed inside the endless track and mounted to the second axle, the belt being received in part inside the second pulley, and a brake assembly operatively connected to one of the first and second pulleys. A snowmobile having the track assembly is also disclosed.

29 Claims, 33 Drawing Sheets

(51) Int. Cl.
*F16D 55/22* (2006.01)
*F16D 65/18* (2006.01)
*B60G 3/20* (2006.01)
*B60T 8/26* (2006.01)
*B62L 1/00* (2006.01)

(56) References Cited

U.S. PATENT DOCUMENTS

| | | | |
|---|---|---|---|
| 4,072,203 A | 2/1978 | Pierson | |
| 4,923,257 A * | 5/1990 | Purcell | B62D 55/0655 180/9.1 |
| 7,644,788 B2 * | 1/2010 | Scheetz | B62D 55/112 180/9.5 |
| 7,789,183 B2 * | 9/2010 | Sadakuni | B62D 55/07 180/190 |
| 8,267,212 B1 | 9/2012 | Mercier et al. | |
| 2003/0209372 A1 | 11/2003 | Campbell et al. | |
| 2006/0060395 A1 * | 3/2006 | Boivin | B62D 11/08 180/9.21 |
| 2007/0246268 A1 | 10/2007 | Snyder et al. | |
| 2009/0101427 A1 | 4/2009 | Baldwin | |
| 2014/0332298 A1 * | 11/2014 | Girouard | B62M 27/02 180/190 |
| 2015/0042153 A1 * | 2/2015 | Lussier | B62D 55/12 305/184 |

* cited by examiner

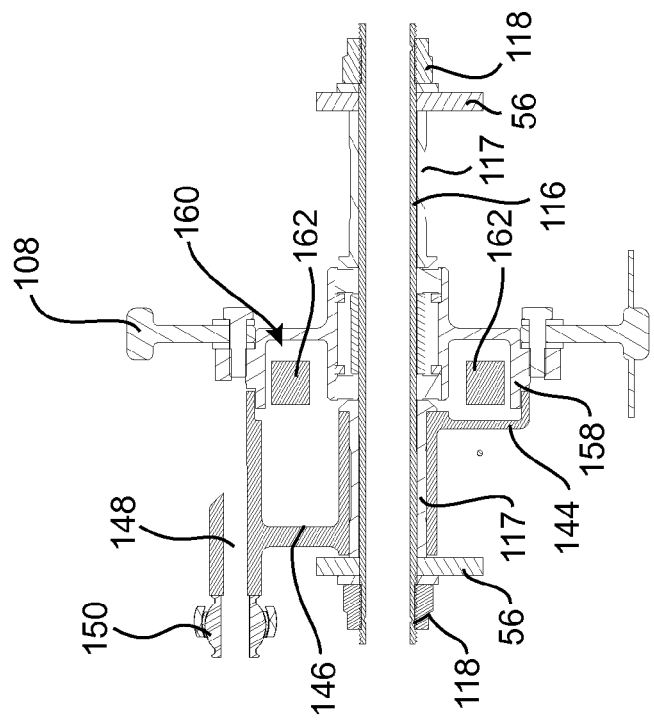
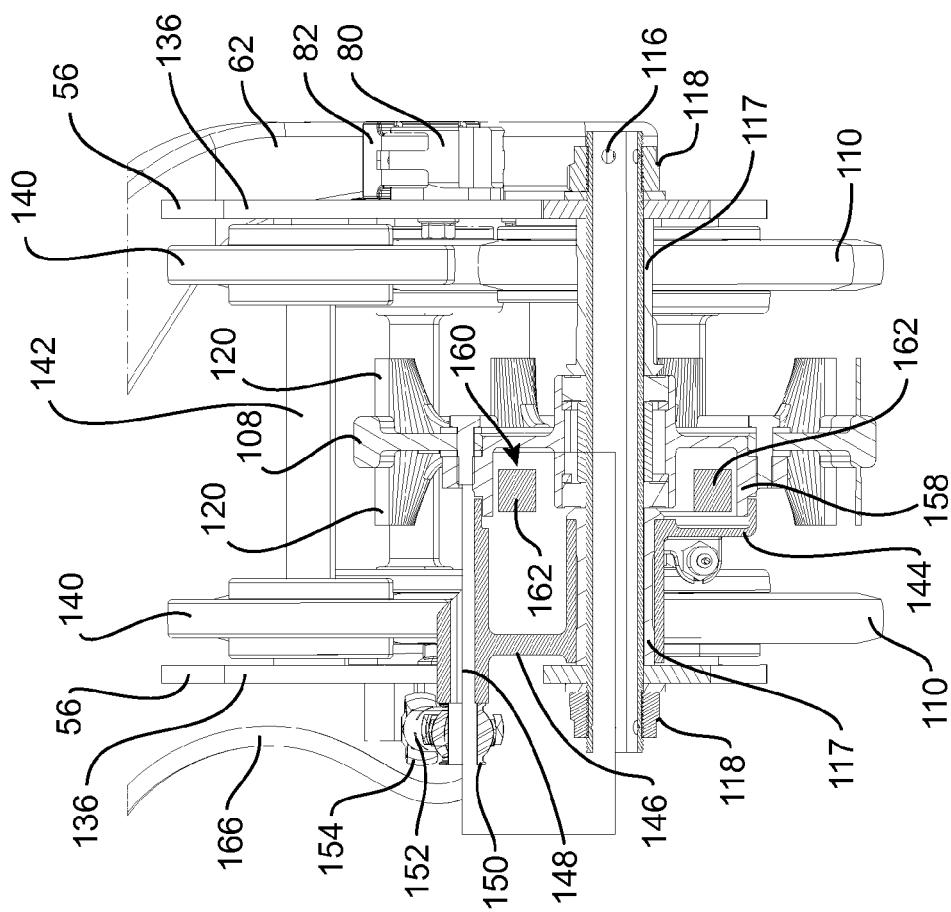

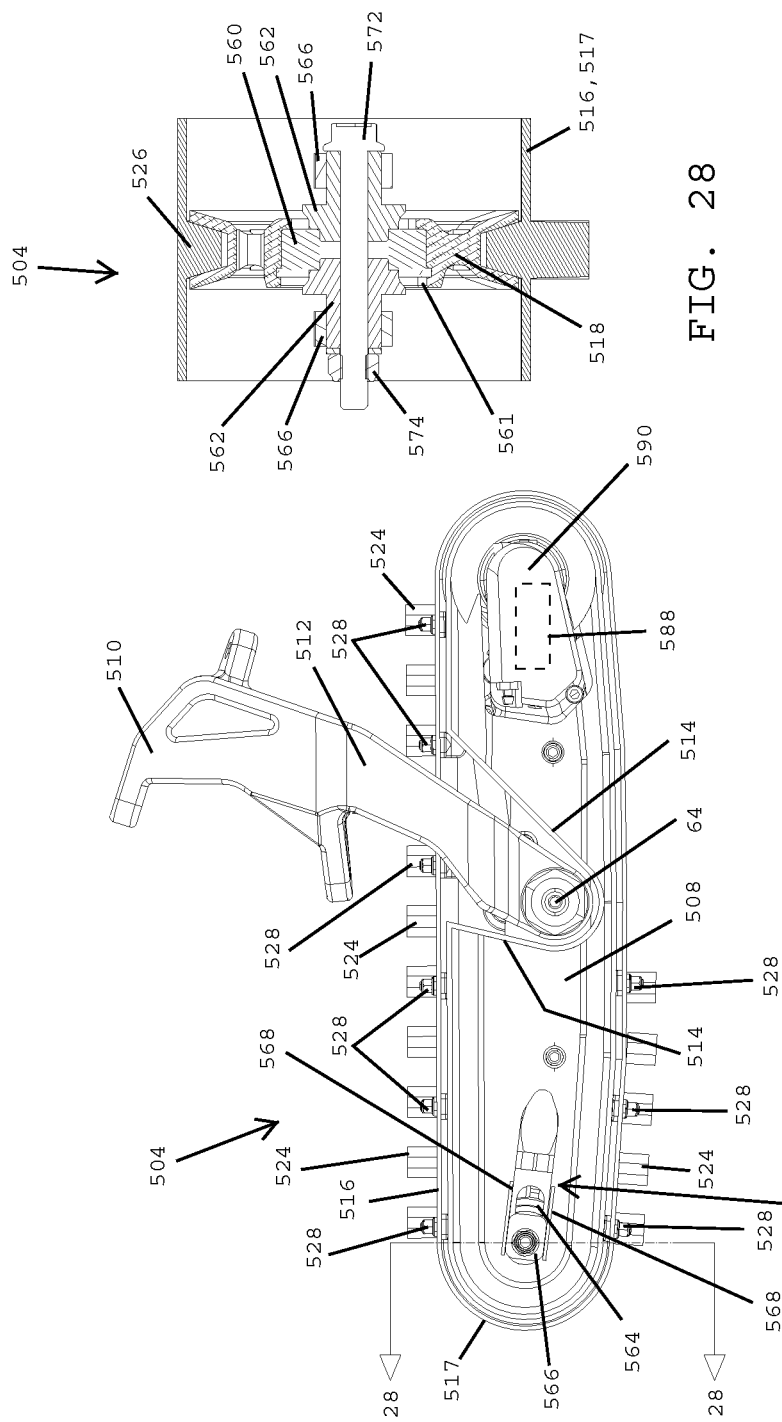

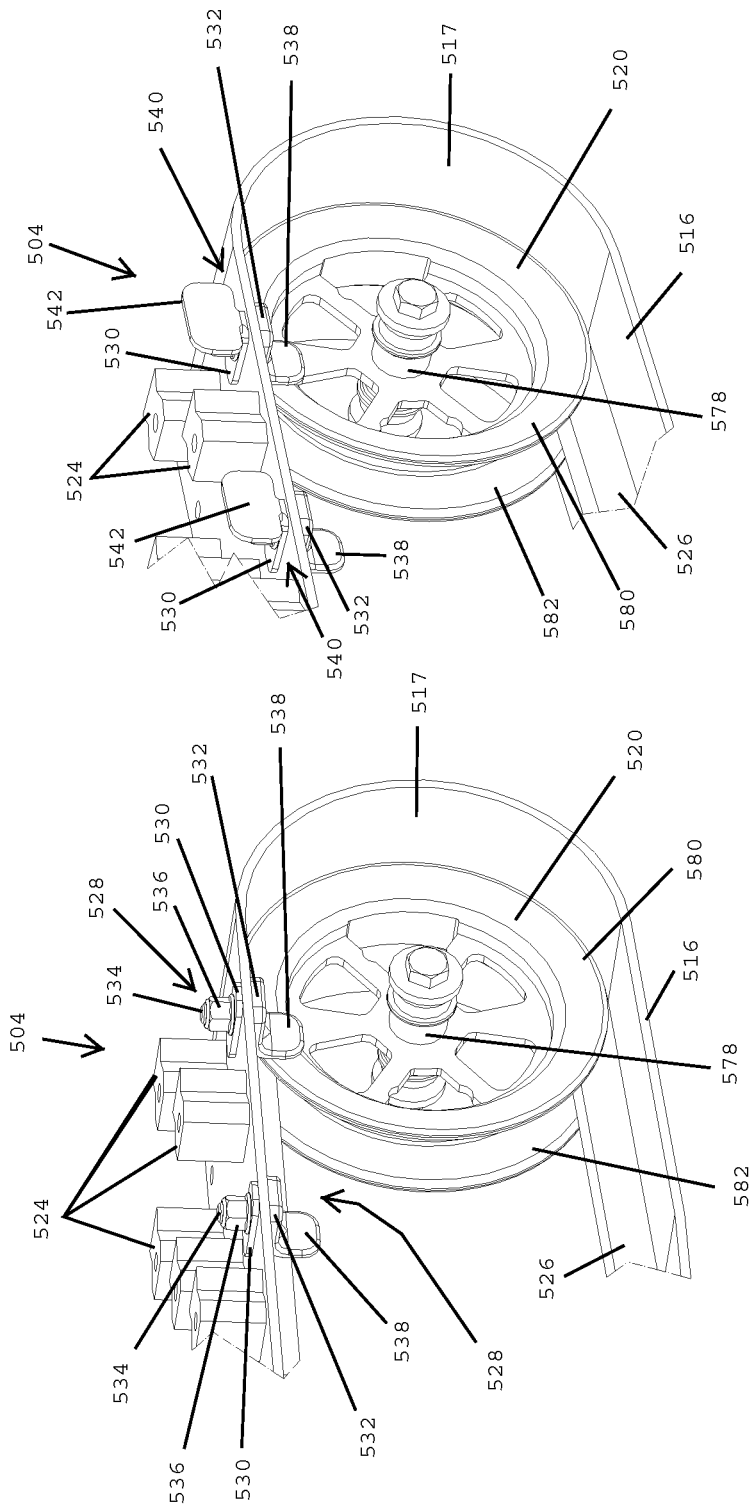

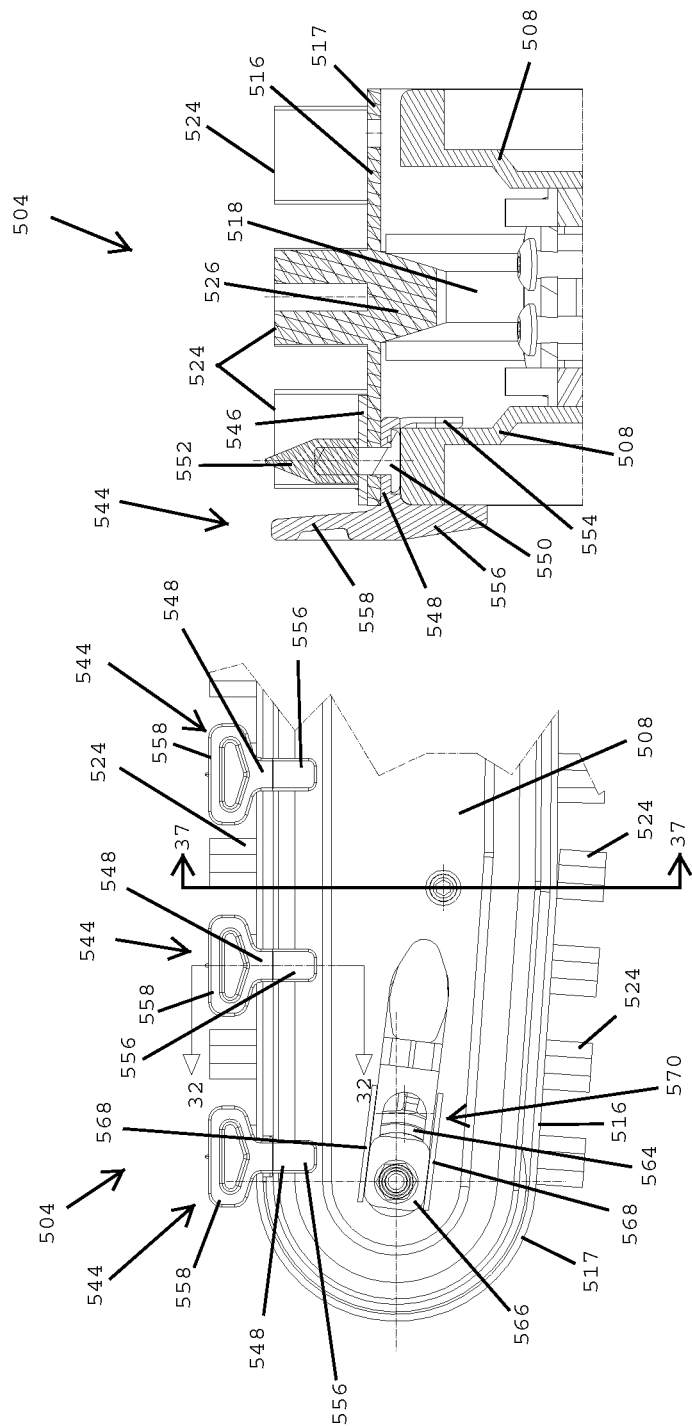

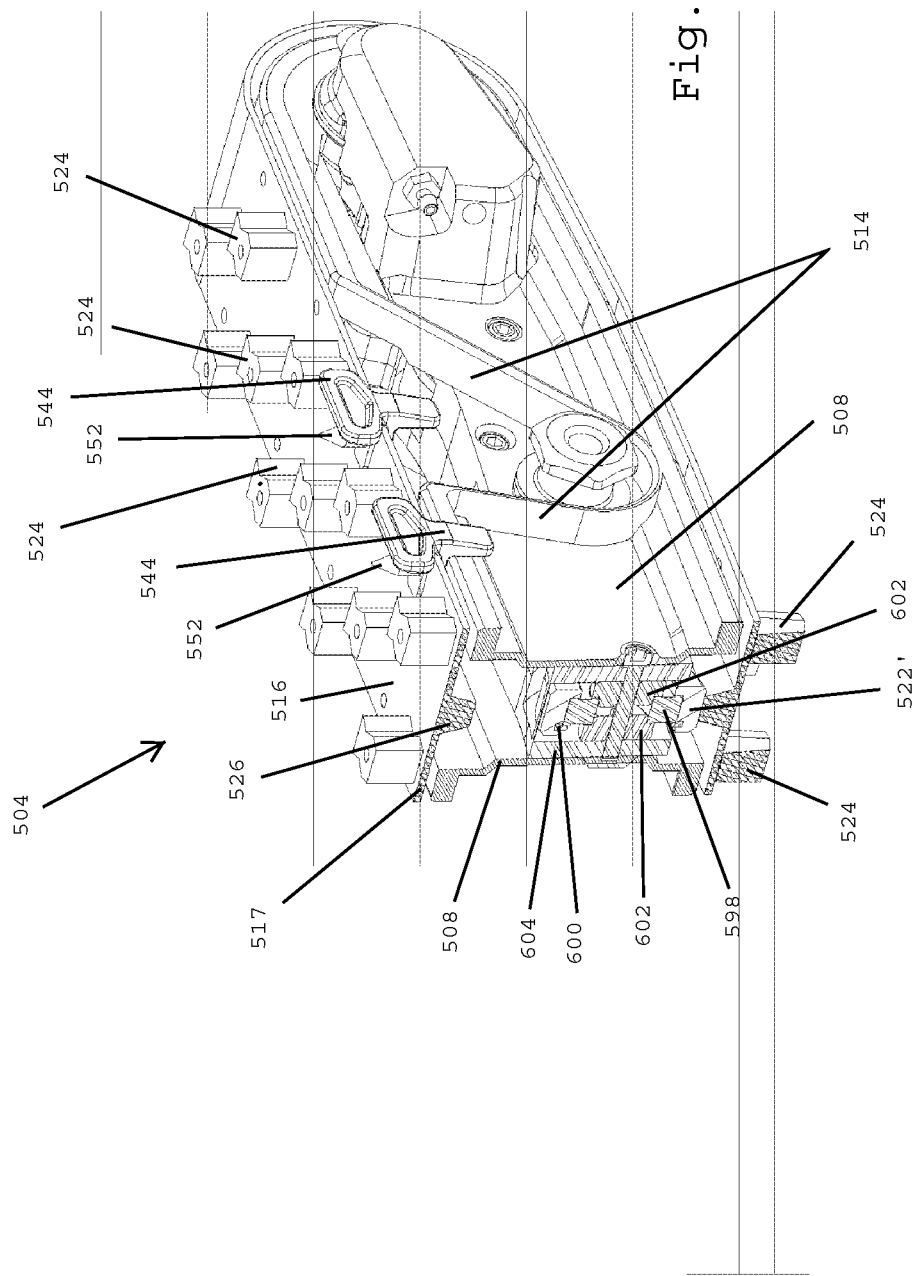

FRONT TRACK ASSEMBLY FOR A SNOWMOBILE

CROSS-REFERENCE

The present application claims priority to U.S. Provisional Patent Application No. 61/919,665, filed Dec. 20, 2013, the entirety of which is incorporated herein by reference. The present application is a continuation-in-part of U.S. patent application Ser. No. 14/351,266, filed Oct. 12, 2012, which is a United States National Phase Entry of International Patent Application No. PCT/US2012/059903, filed Oct. 12, 2012, which claims priority to U.S. Provisional Patent Application No. 61/546,239, filed Oct. 12, 2011, the entirety of all three of which is incorporated herein by reference.

FIELD OF TECHNOLOGY

The present technology relates to front track assemblies for snowmobiles, and to snowmobiles incorporating such assemblies.

BACKGROUND

A conventional snowmobile is propelled by a rear track that is driven by an engine disposed on the snowmobile. One or two front skis are used to steer the snowmobile. The skis are designed to have a smooth gliding surface in contact with the snow, to provide flotation on the snow and reduce friction while the snowmobile is moving.

When a rider attempts to brake the snowmobile, a braking force is applied to some part of the power transmission between the engine and the rear track, usually to one of the rotating shafts. This braking force causes the rotation of the rear track to slow or stop, which in turn creates drag between the rear track and the snow, reducing the speed of the snowmobile.

During braking, a portion of the weight of the snowmobile is transferred from the rear track to the front skis. However, the front skis do not assist in braking, despite bearing an increased proportion of the weight of the snowmobile, because they are designed to float above the snow and generate as little friction with the snow as possible. It may be desirable in some snowmobiles to provide braking at the front of the snowmobile in view of this weight transfer.

SUMMARY

It is an object of the present technology to ameliorate at least some of the inconveniences of the prior art.

In one aspect, the present technology provides a track assembly for a vehicle having an endless track having a belt disposed on an inner side thereof, a frame member, a first axle connected to the frame member and disposed at least in part inside the track, a first pulley disposed inside the endless track and mounted to the first axle, the first pulley being rotatable relative to the frame member, the belt being received in part inside the first pulley, a second axle connected to the frame member and disposed at least in part inside the track, a second pulley disposed inside the endless track and mounted to the second axle, the belt being received in part inside the second pulley, and a brake assembly operatively connected to one of the first and second pulleys.

In some implementations of the present technology, a leg is pivotally connected to the frame member.

In some implementations of the present technology, the brake assembly is operatively connected to the second pulley.

In some implementations of the present technology, the first axle is disposed forwardly of the second axle.

In some implementations of the present technology, the second pulley is rotatable relative to the frame member. The brake assembly includes a brake disk and at least one brake caliper, the brake disk being rotationally fixed relative to the second pulley.

In some implementations of the present technology, the second pulley includes a first sheave portion and a second sheave portion. The belt is received in part between the first and second sheave portions. The first and second sheave portions are selectively movable toward each other. The brake assembly is operatively connected to at least one of the first and second sheave portions to selectively move the first and second sheave portions toward each other to squeeze the belt between the first and second sheave portions.

In some implementations of the present technology, a first brake pad selectively abuts the first sheave portion. A second brake pad selectively abuts to the second sheave portion.

In some implementations of the present technology, the brake assembly includes a hydraulic actuator.

In some implementations of the present technology, the second pulley is rotationally fixed relative to the frame member.

In some implementations of the present technology, a housing is connected to the frame member. The brake assembly is disposed at least in part in the housing.

In some implementations of the present technology, a ski element is connected to the frame member.

In some implementations of the present technology, the belt has a trapezoidal cross-section.

In another aspect, the present technology provides a snowmobile having a frame defining a tunnel, a motor mounted to the frame, a seat disposed on the tunnel, a first track assembly disposed under the tunnel and being operatively connected to the motor to be driven by the motor, a handlebar mounted to the frame at least in part forwardly of the seat, and at least one second track assembly disposed forwardly of the first track assembly and being operatively connected to the handlebar to be steered by the handlebar. The at least one second track assembly has at least one aspect of the above track assembly.

In some implementations of the present technology, the at least one second track assembly is two second track assemblies disposed on opposite sides of a longitudinal centerline of the snowmobile.

In another aspect, the present technology provides a track assembly for a vehicle having an endless track having an outer side, an inner side, a first lateral edge and a second lateral edge, the endless track having a plurality of lugs protruding from the outer side thereof, a frame member, a first axle connected to the frame member and disposed at least in part inside the track, a first wheel disposed inside the endless track and mounted to the first axle, the first wheel being rotatable relative to the frame member, a second axle connected to the frame member and disposed at least in part inside the track, a second wheel disposed inside the endless track and mounted to the second axle, and a plurality of cleats connected to the endless track and extending outwardly from the outer side. The plurality of cleats is disposed at at least one of: at least in part laterally between the plurality of lugs and the second lateral edge; beside the second lateral edge; and at least in part laterally outwardly of the second lateral edge.

In some implementations of the present technology, a plurality of studs connected to the endless track and extending outwardly from the outer side. The plurality of studs is disposed laterally inwardly of at least a portion of the plurality of cleats. Each stud of the plurality of studs is longitudinally aligned with a corresponding cleat of the plurality of cleats.

In some implementations of the present technology, at least some cleats of the plurality of cleats extend inwardly from the inner side.

In some implementations of the present technology, an inwardly extending portion of each of the at least some of the plurality of cleats selectively abuts at least one of: the first and second wheels; and the frame member.

In some implementations of the present technology, the track assembly is adapted to be operatively connected to a handlebar of a vehicle to be steered by the handlebar and to be disposed to one side of a longitudinal centerline of the vehicle. When the track assembly is operatively connected to the handlebar, the first lateral edge is disposed laterally between the longitudinal centerline of the vehicle and the second lateral edge.

In some implementations of the present technology, a leg is pivotally connected to the frame member.

In some implementations of the present technology, the second wheel is fixed relative to the frame member.

In some implementations of the present technology, a brake assembly is operatively connected to one of the first and second wheels.

In some implementations of the present technology, the endless track has a belt disposed on an inner side thereof. The first and second wheels are first and second pulleys. The belt is received in part inside the first and second pulleys.

In some implementations of the present technology, a ski element is connected to the frame member.

In another aspect, the present technology provides a snowmobile having a frame defining a tunnel, a motor mounted to the frame, a seat disposed on the tunnel, a first track assembly disposed under the tunnel and being operatively connected to the motor to be driven by the motor, a handlebar mounted to the frame at least in part forwardly of the seat, and at least one second track assembly disposed forwardly of the first track assembly and being operatively connected to the handlebar to be steered by the handlebar. The at least one second track assembly has at least one aspect of the above track assembly.

In some implementations of the present technology, the at least one second track assembly is two second track assemblies disposed on opposite sides of a longitudinal centerline of the snowmobile.

In some implementations of the present technology, for each second track assembly, the first lateral edge is disposed laterally between the longitudinal centerline and the second lateral edge.

In another aspect, the present technology provides an endless track for a vehicle having a track body having an outer side, an inner side, a first lateral edge and a second lateral edge, a plurality of lugs protruding from the outer side of the track body, at least one endless belt disposed on the inner side, a plurality of cleats connected to the track body and extending outwardly from the outer side. The plurality of cleats is disposed at at least one of: at least in part laterally between the plurality of lugs and the second lateral edge; beside the second lateral edge; and at least in part laterally outwardly of the second lateral edge.

In some implementations of the present technology, the at least one endless belt has a trapezoidal cross-section.

In some implementations of the present technology, the at least one endless belt is a single endless belt centered between the first and second lateral edges.

In some implementations of the present technology, a plurality of studs is connected to the track body and extends outwardly from the outer side. The plurality of studs is disposed laterally inwardly of at least a portion of the plurality of cleats. Each stud of the plurality of studs is longitudinally aligned with a corresponding cleat of the plurality of cleats.

In some implementations of the present technology, at least some cleats of the plurality of cleats extend inwardly from the inner side.

In some implementations of the present technology, the plurality of cleats is disposed at least in part laterally between the plurality of lugs and the second lateral edge.

In some implementations of the present technology, the plurality of cleats is disposed beside the second lateral edge.

In some implementations of the present technology, the plurality of cleats is disposed at least in part laterally outwardly of the second lateral edge.

For purposes of this application, terms related to spatial orientation such as "forwardly", "rearwardly", "right" and "left" are defined with respect to a forward direction of travel of the snowmobile, and should be understood as they would be understood by a rider sitting on the snowmobile in a normal riding position.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 10 is a cross-sectional view of the elements of FIG. 8, taken through line A-A of FIG. 9;

FIG. 11 is a slice of the elements of FIG. 8, taken through line A-A of FIG. 9;

FIG. 27 is a left side elevation view of the front track assembly of the left ski and front track assembly of FIG. 26;

FIG. 28 is a cross-sectional view of the front track assembly of FIG. 27 taken through line 28-28 of FIG. 27 with the side frame members removed;

FIG. 29 is a perspective view taken from a front, left side of a rear portion of the track assembly of FIG. 27;

FIG. 30 is a perspective view taken from a front, left side of the rear portion of the track assembly of FIG. 27 having an alternative type of cleats;

FIG. 31 is a left side elevation view of a front portion of the track assembly of FIG. 27 having another alternative type of cleats;

FIG. 32 is cross-sectional view of the track assembly of FIG. 31 taken through line 32-32 of FIG. 31;

FIG. 37 is a cross-sectional view of the track assembly of FIG. 27 having the cleats of the implementation of FIG. 31 taken through line 37-37 of FIG. 31 and having an alternative implementation of an intermediate wheel.

DETAILED DESCRIPTION

Figure 1:
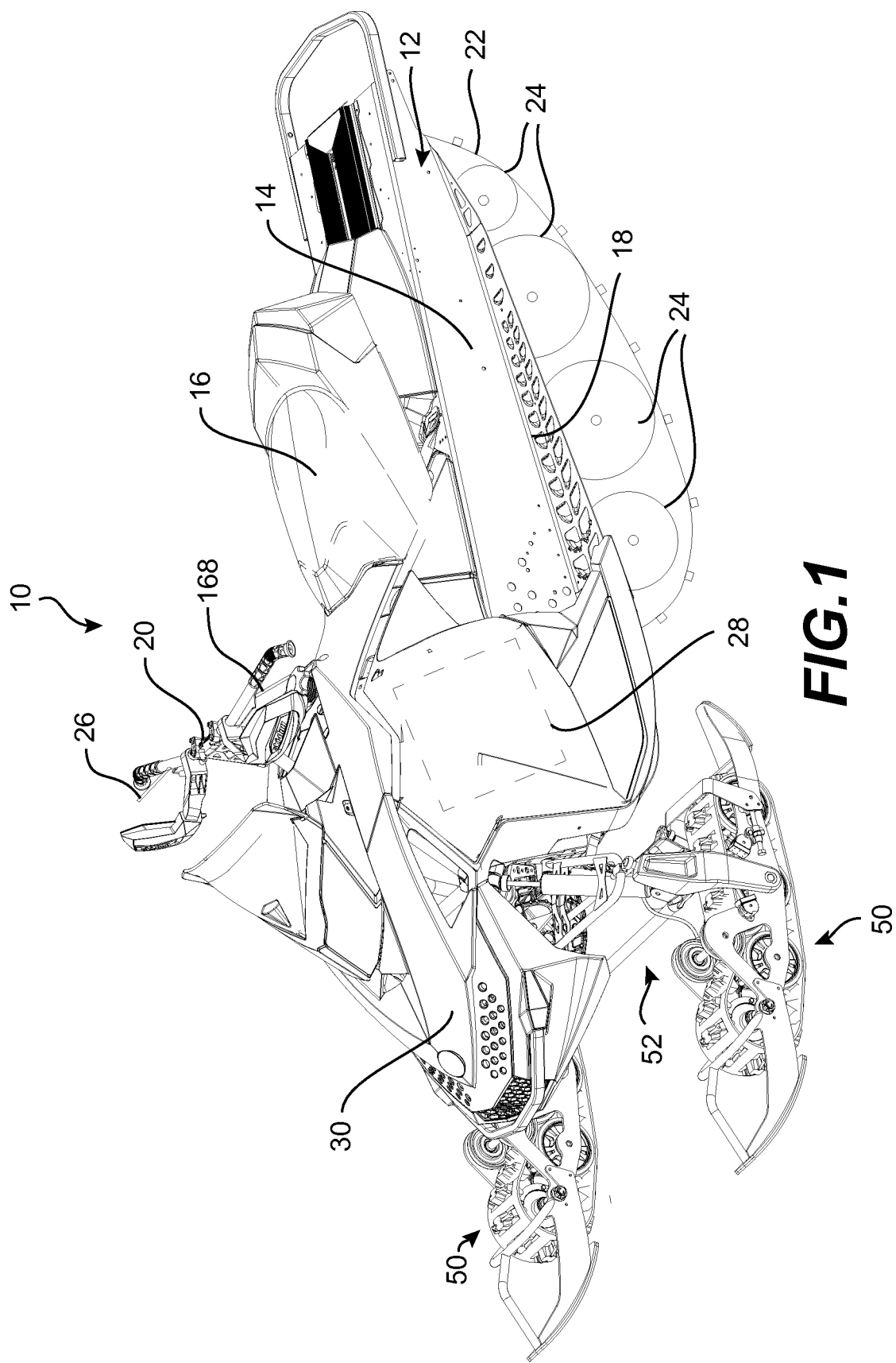
FIG. 1 is a perspective view taken from a front, left side of a snowmobile.
Figure 2:
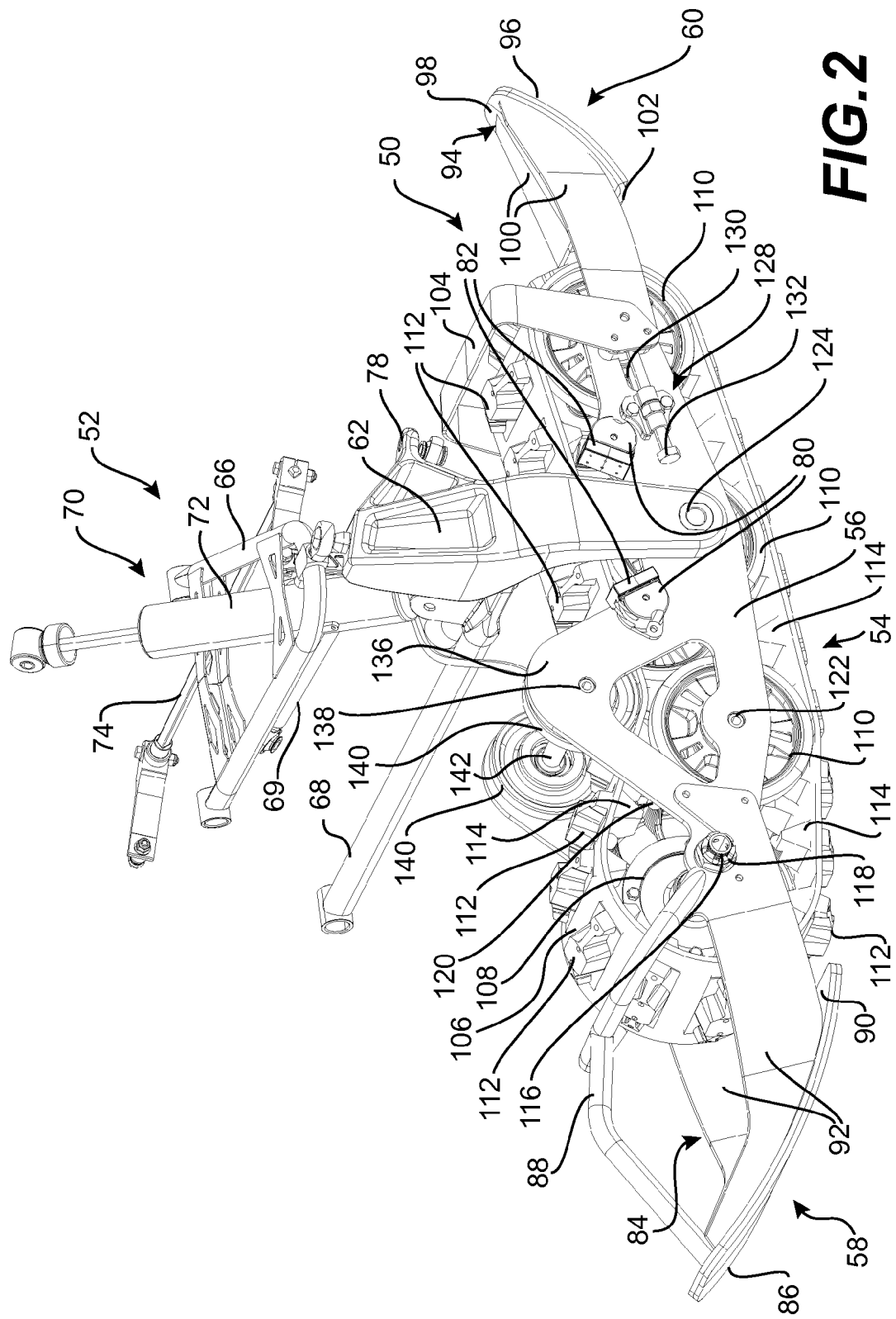
FIG. 2 is a perspective view taken from a front, left side of a left ski and front track assembly of the snowmobile of FIG. 1.
Figure 3:
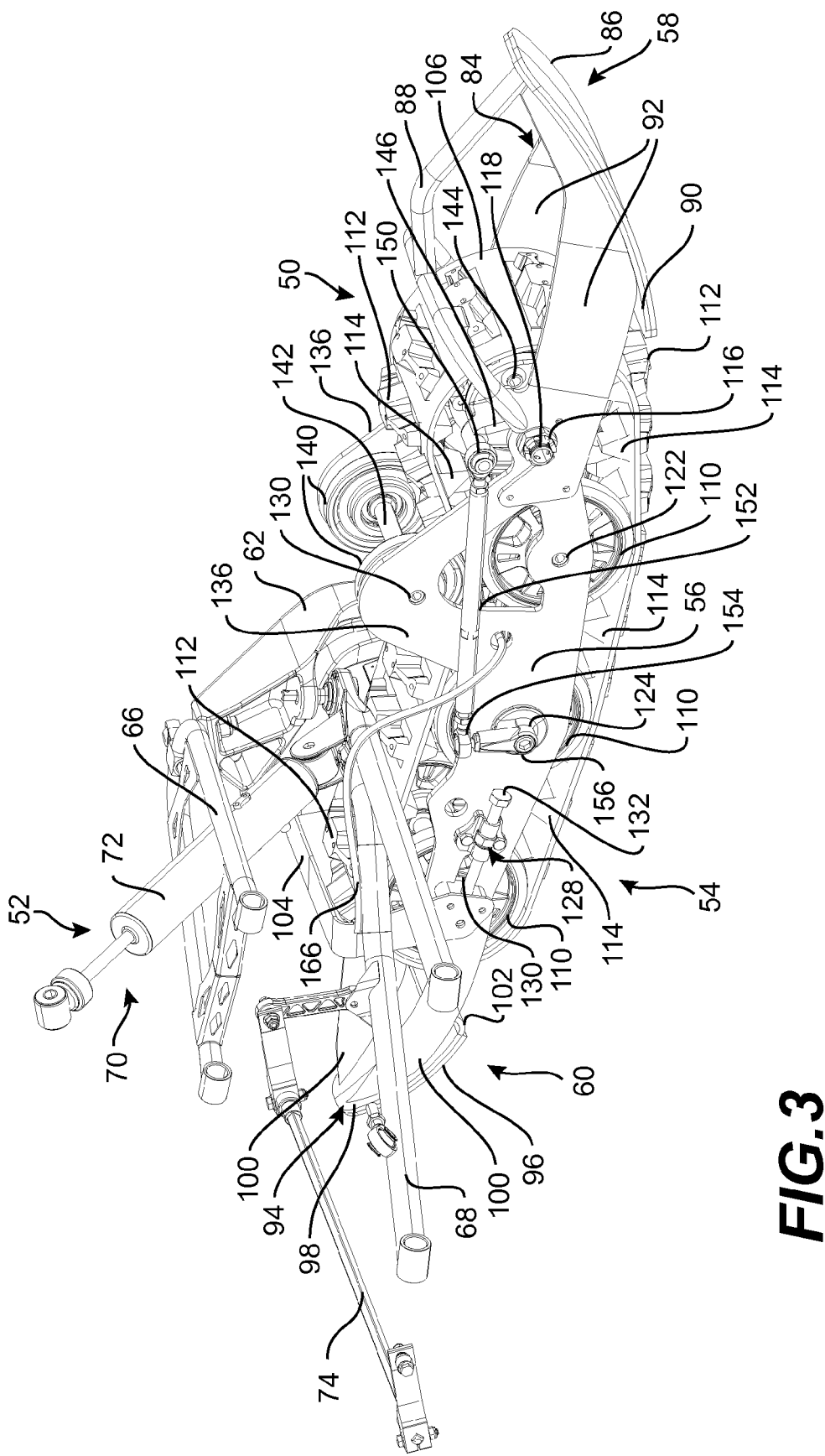
FIG. 3 is a perspective view taken from a front, right side of the assembly of FIG. 2

A snowmobile 10, shown in FIG. 1, has a frame 12. The frame 12 includes a tunnel 14. The tunnel 14 supports a seat 16 for a rider. It is contemplated that the seat 16 could be made longer to also accommodate a passenger. Footrests 18 extend on the left and right sides of the tunnel 14 for supporting the feet of the rider. A handlebar 20 is provided forwardly of the seat 14 allow the rider to steer the snowmobile 10. The handlebar 20 is connected to a steering column 21. A central endless drive track 22 is disposed toward the rear of the snowmobile 10, along a longitudinal centerline of the snowmobile 10 and generally below the tunnel 14. Wheels 24 are disposed inside the track 22. The wheels 24 are connected to the frame 12 via a suspension assembly (not shown). It is contemplated that the track 22, the wheels 24 and the suspension assembly could be similar to those of International Patent Publication No. WO 2011/075141 A1, published Jun. 23, 2011, the entirety of which is incorporated herein by reference. A braking system (not shown) of the type typically found in snowmobiles is provided for the track 22. The braking system is actuated by a brake lever 168 provided on the left side of the handlebar 20. A motor 28 (shown schematically), which in the present implementation is an internal combustion engine, is supported on the frame 12 and is operatively connected to the track 22 via a transmission (not shown). A cowling 30, made of multiple parts, encloses the motor 28, thereby protecting the motor 28 and also making the snowmobile 10 more aesthetically pleasing.

The snowmobile 10 has many other features typically found in snowmobiles, such as for example, but not limited to, an exhaust system, an air intake system and a fuel tank. As these features are believed to be well known, they will not be described in the present application.

As can be seen in FIG. 1, the left and right skis typically found on a snowmobile have been replaced by left and right ski and front track assemblies 50. The left and right ski and front track assemblies 50 are connected to the frame 12 via corresponding left and right front suspension assemblies 52. It is contemplated that in snowmobiles having only a single ski, that the ski could also be replaced by a ski and front track assembly 50.

Turning now to FIGS. 2 to 12, the left ski and front track assembly 50 and its corresponding suspension assembly 52 will be described. The right ski and front track assembly 50 and its corresponding suspension assembly 52 will not be described in detail herein. However, it should be understood that the right ski and front track assembly 50 and its corresponding suspension assembly 52 are mirror images of the left ski and front track assembly 50 and its corresponding suspension assembly 52. It is contemplated that at least some elements of the left and right ski and front track assemblies 50 and their corresponding suspension assembly 52 could differ.

Figure 4:
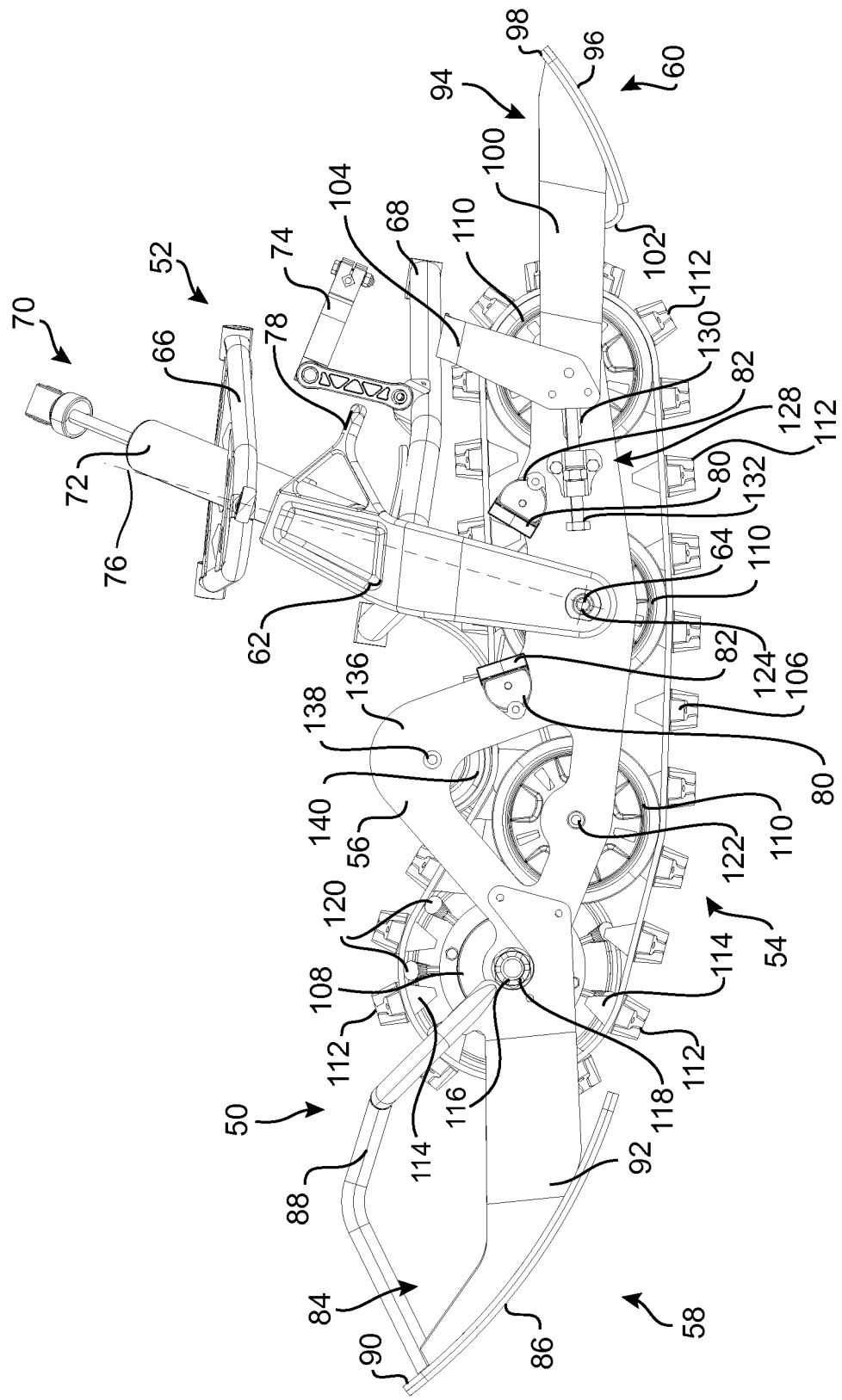
FIG. 4 is a left side elevation view of the assembly of FIG. 2.
Figure 5:
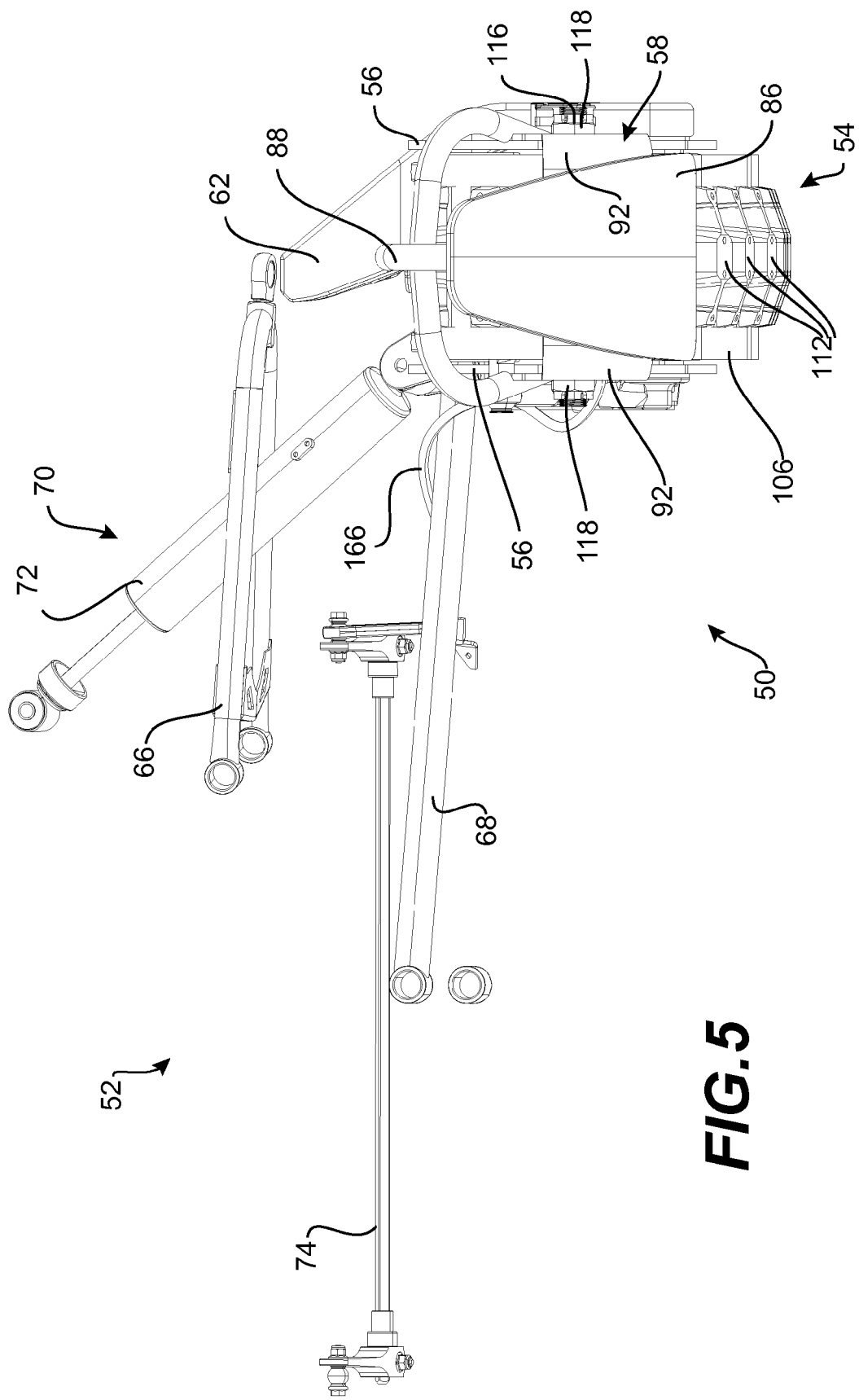
FIG. 5 is a front elevation view of the assembly of FIG. 2.
Figure 6:
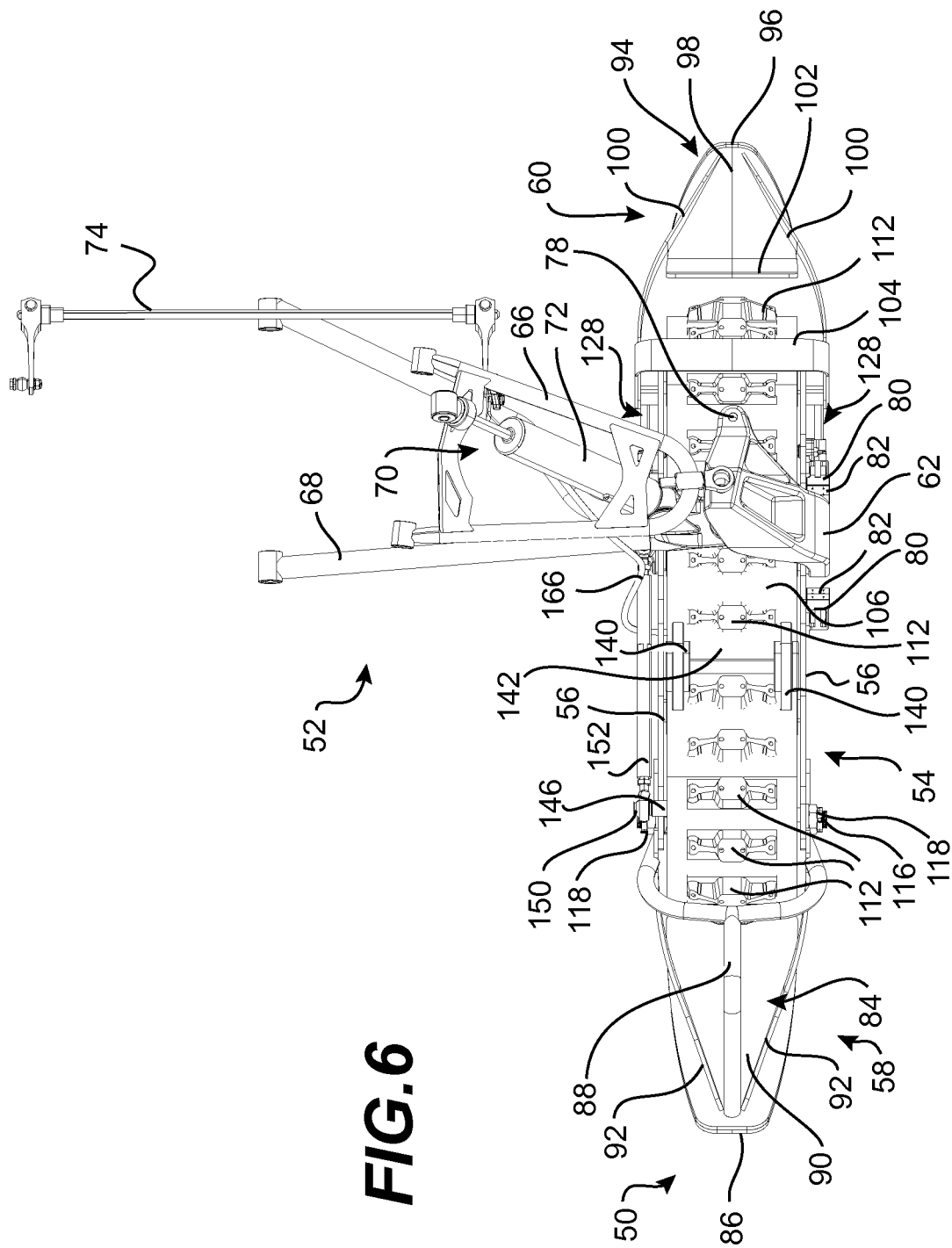
FIG. 6 is a top plan view of the assembly of FIG. 2.

The ski and front track assembly 50 has a track assembly 54 having side frame members 56 to which front and rear ski elements 58, 60 are connected as will be described in greater detail below. It is contemplated that the rear ski portion 60 could be omitted. A leg 62 is pivotally connected the side frame members 56 about a generally horizontal axis 64 (FIG. 4). The suspension assembly 52 is connected to the leg 62. The suspension assembly 52 is what is known as a double A-arm suspension. It is contemplated that other types of suspensions could be used, such as for example, but not limited, a swing-arm type suspension.

Figure 16:
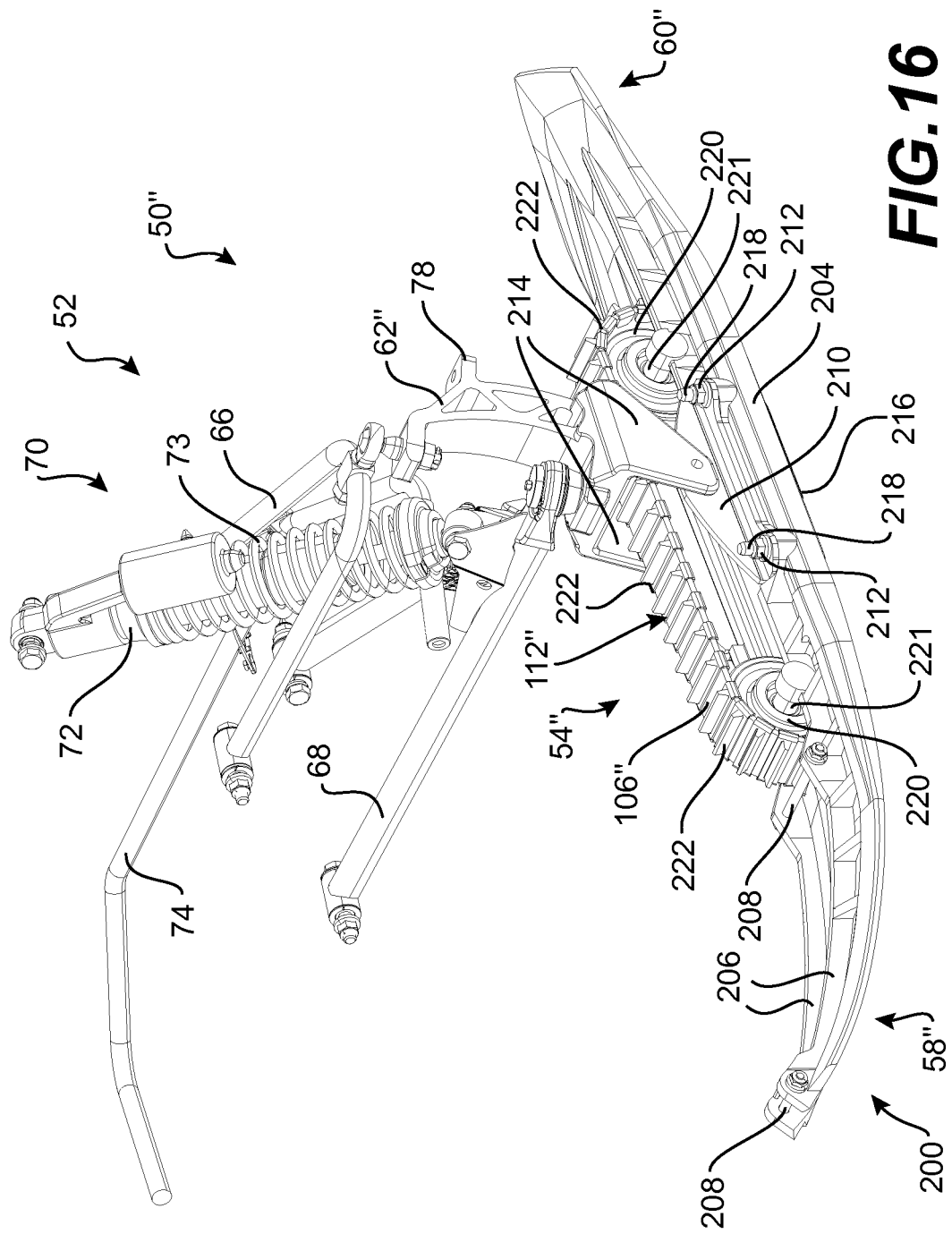
FIG. 16 is a perspective view taken from a front, left side of another alternative implementation of a left ski and front track assembly of the snowmobile of FIG. 1.

The suspension assembly 52 includes an upper A-arm 66, a lower A-arm 68, and a shock absorber 70. One end of the upper A-arm 66 is pivotally connected to the frame 12 and the other end is pivotally connected to the upper end of the leg 62. One end of the lower A-arm 68 is pivotally connected to the frame 12 and the other end is pivotally connected to the leg 62 at a point below the point where the upper A-arm 66 is connected to the leg 62. The shock absorber 70 consists of a hydraulic cylinder 72 around which a coil spring 73 (not shown in the present implementation, but shown in the implementation of FIG. 16) is disposed. The lower end of the shock absorber 70 is pivotally connected to the outer end portion of the lower A-arm 68. The upper end of the shock absorber 70 is pivotally connected to the frame 12. A sway-bar 74 is connected between the lower A-arm 68 and the frame 12.

The ski and front track assembly 50 is steerable about a generally vertical axis 76 (FIG. 4) passing through the connection points between the A-arms 66, 68 and the leg 62. A steering linkage 69 (FIG. 2) is operatively connected between the steering column 21 and a flange 78 protruding from a rear portion of the leg 62, such that when the handlebar 20 is turned, the ski and front track assembly 50 is steered about the axis 76.

Figure 7A:
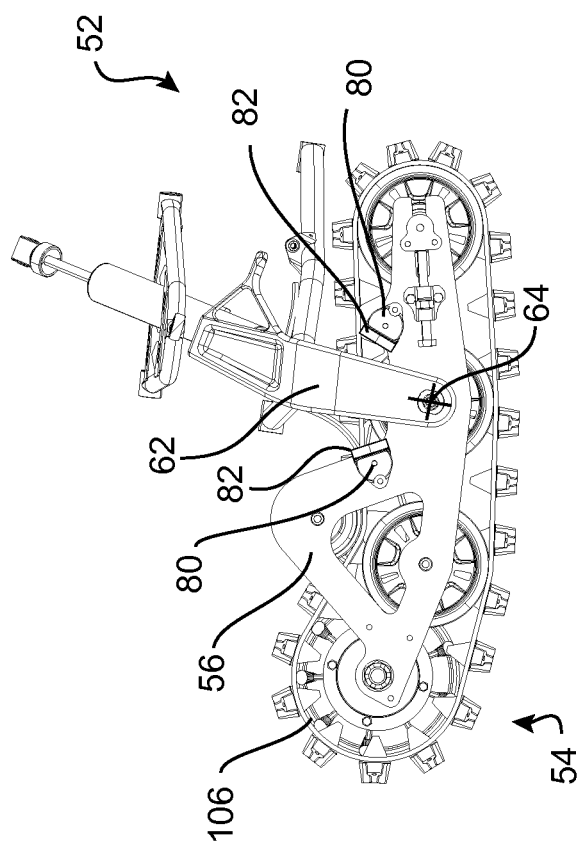
FIGS. 7A to 7C are left side elevation views of the assembly of FIG. 2, without the ski, with the front track at different positions about a pivot axis of the assembly.
Figure 7B:
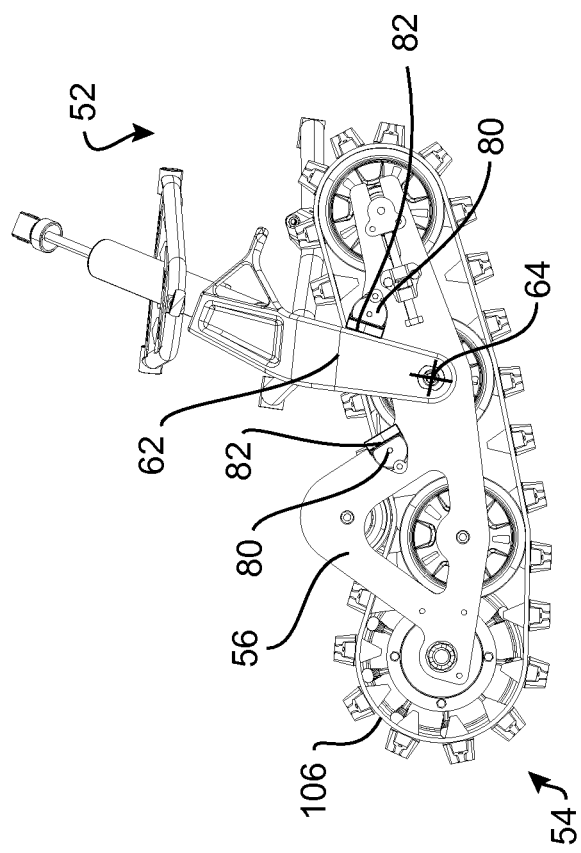
Figure 7C:
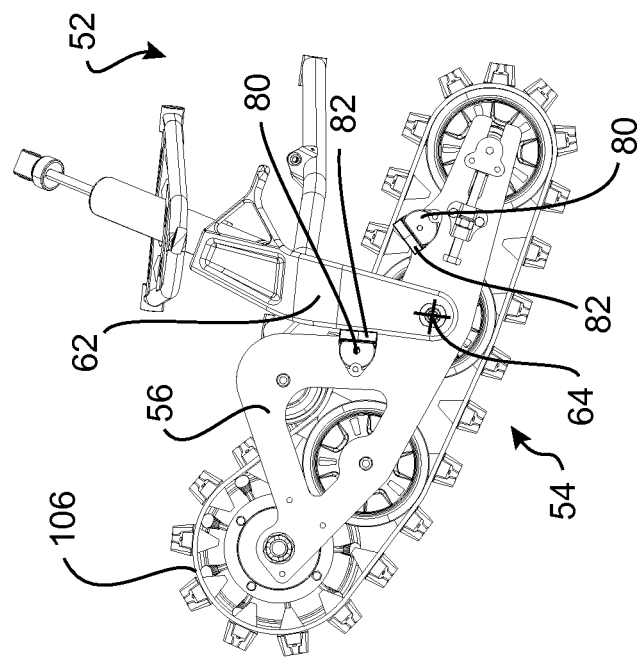
Figure 8:
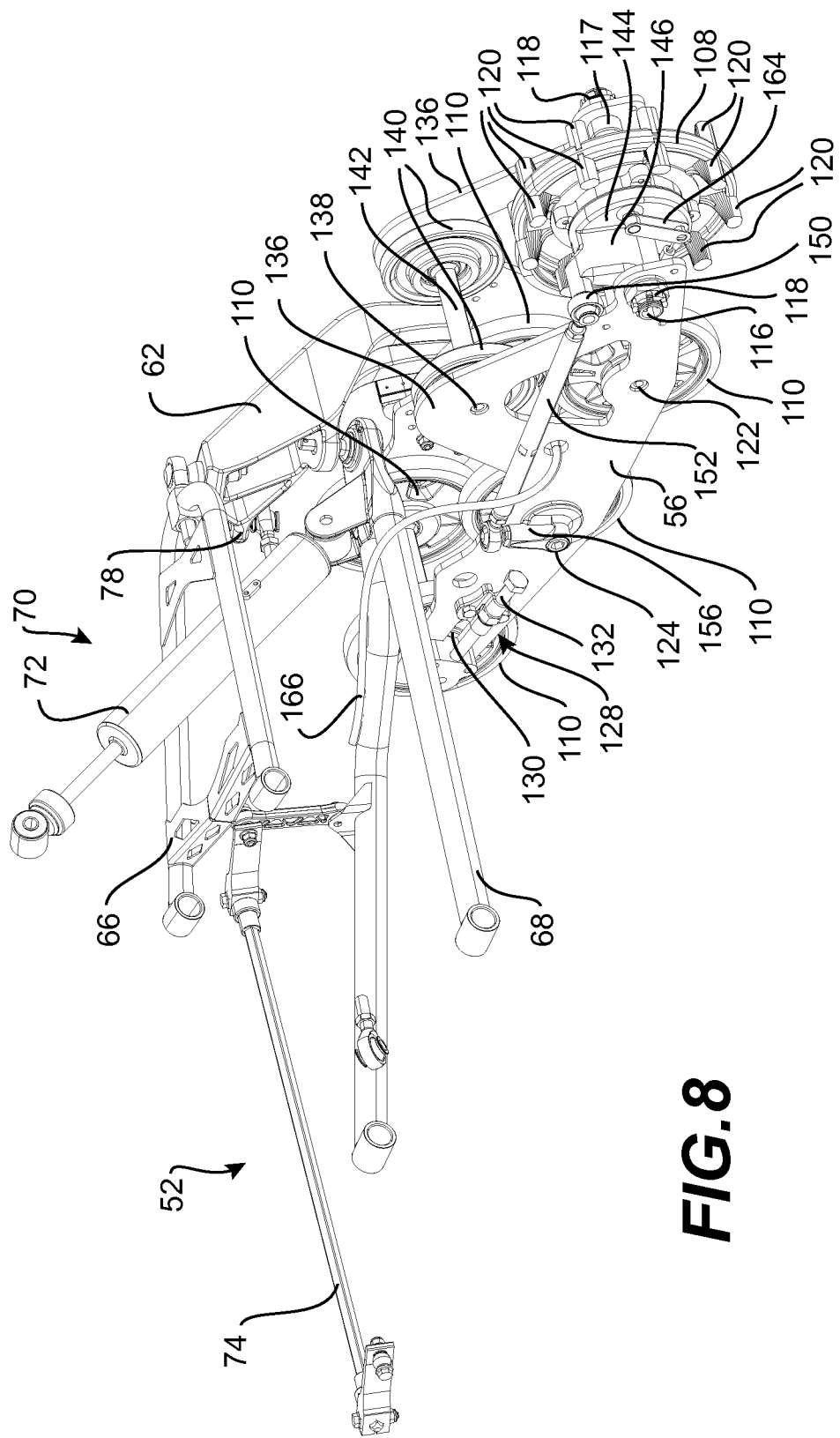
FIG. 8 is a perspective view taken from a front, right side of the assembly of FIG. 2, without the ski and the track.
Figure 9:
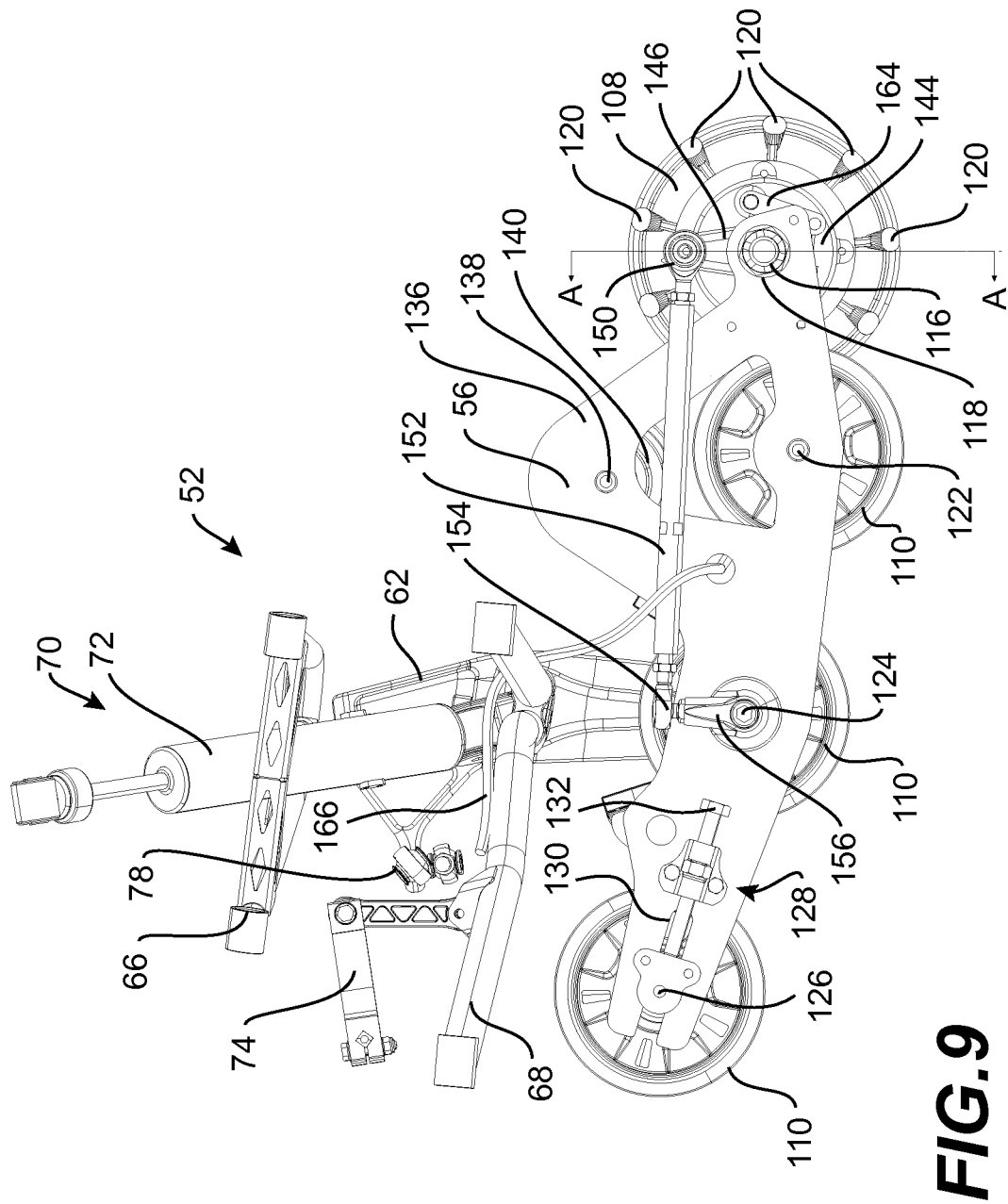
FIG. 9 is a right side elevation view of the elements of FIG. 8.

As can be seen in FIGS. 7A to 7C, the track assembly 54 (and the ski elements 58, 60, although not shown in these figures) can pivot clockwise and counterclockwise about the axis 64 as the ski and front track assembly 50 moves over bumps and depressions in the surface over which the snowmobile operates. Stoppers 80 are mounted to the outer side frame member 56. One stopper 80 is mounted in front of the leg 62 and the other stopper is mounted 80 behind the leg 62. As can be seen in FIGS. 7B and 7C, the stoppers 80 contact the leg 62 as the track assembly 54 pivots about the axis 64 by a certain amount to limit the rotation of the track assembly 54 about the axis 64, thus preventing contact between the track assembly 54 and the lower A-arm 68. The stoppers 80 are provided with polymeric bumpers 82 to soften the impact between the stoppers 80 and the leg 62.

The front ski element 58 includes a bracket 84, a ski plate 86, and a handle 88. The bracket 84 includes a tapered and curved plate 90 from which two arms 92 extend rearwardly. Each arm 92 is connected to a corresponding one of the side frame member 56 on an outer side thereof as shown. The ski plate 86 is connected to the bottom of the curved plate 90 and is shaped to be congruous therewith. The handle 88 is generally T-shaped and is connected to a front of the plate 90 and to a rear portion of the two arms 92. The handle 88 can be used to manually lift a front end of the snowmobile 10.

The rear ski element 60 includes a bracket 94 and a ski plate 96. The bracket 94 includes a tapered and curved plate 98 from which two arms 100 extend forwardly. A front end 102 of the curved plate 98 is upturned, as best seen in FIG. 4. Each arm 100 is connected to a corresponding one of the side frame member 56 on an outer side thereof as shown. The ski plate 96 is connected to the bottom of the curved plate 98 and is shaped to be congruous therewith. A bracket 104 is connected to the side frame members 56 via the arms 100, such that each arm 100 is disposed between its corresponding portion of the bracket 104 and its corresponding side frame member 56. As can be seen, the bracket 104 straddles the rear portion of the track assembly 54.

The track assembly 54 includes an endless track 106 disposed around a sprocket wheel 108 and six wheels 110. It is contemplated that there could be more or less than six wheels 110. As the snowmobile 10 moves forward or backward, the track 106 turns around the wheels 108, 110. The track 106 has a row of external lugs 112 (only some of which are labeled for clarity) disposed on an outer side thereof. The external lugs 112 each have the same shape and are equally spaced apart from each other. It is contemplated that there could be more than one row of external lugs 112, that there could be more than one shape of external lugs 112, and that the spacing between the external lugs 112 could vary. The track 106 also has two rows of equally spaced internal lugs 114 (only some of which are labeled for clarity) disposed on an inner side thereof.

The sprocket wheel 108 is disposed at a front of the track assembly 54. The sprocket wheel 108 is rotatably mounted on an axle 116. Bushing 117 (FIG. 10) are disposed on the axle 116 on either sides of the sprocket wheel 108 to keep the sprocket wheel 108 in the center of the track 106. The axle 116 extends through the side frame members 66 and is fastened by nuts 118. The sprocket wheel 108 rolls inside the track 106 between the two rows of internal lugs 114. The sprocket wheel 108 has sprocket teeth 120 (only some of which are labeled for clarity) extending laterally outwardly from both sides thereof. The teeth 120 engage the internal lugs 114 as the track 106 turns around the sprocket wheel 108 and the wheels 110.

Figure 12:
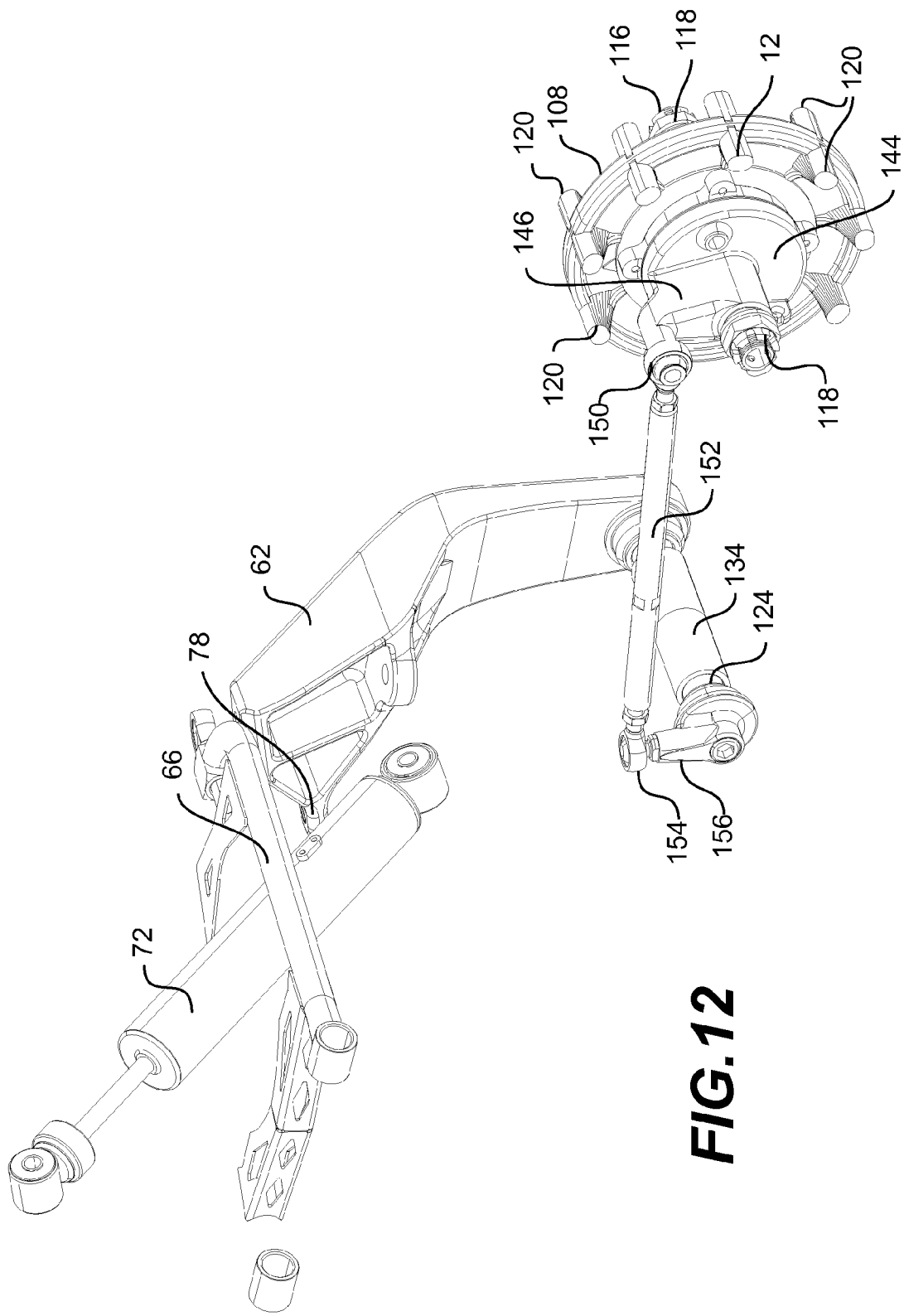
FIG. 12 is a perspective view taken from a front, right side of the assembly of FIG. 2, without the ski, the track, the frame and some of the wheels.

The two front wheels 110 are rotationally mounted on an axle 122 disposed rearwardly of the axle 116. The axle 122 is connected between the two side frame members 56. The two middle wheels 110 are rotationally mounted on an axle 124 disposed rearwardly of the axle 122. The axle 124 extends through the two side frame members 56. The axle 124 is connected at one end to the leg 62 so as to be rotationally fixed relative to the leg 62. It is contemplated that the axle 124 could be integrally formed with the leg 62. The two rear wheels 110 are rotationally mounted on an axle 126 (FIG. 9) disposed rearwardly of the axle 124. The axle 126 is connected between the two side frame members 56 by track tensioning mechanisms 128. The track tensioning mechanisms 128 hold the axle 126 inside slots 130 in the side frame members 56. By turning fasteners 132 of the track tensioning mechanisms 128, the longitudinal position of the axle 126 can be adjusted, thereby adjusting a tension in the track 106. The arms 100 and the bracket 104 are connected to the side frame member 56 via the track tensioning mechanisms 128 so as to move together with the axle 126. The six wheels 110 are arranged so as to roll on the internal surface of the track 106 laterally outwardly of the internal lugs 114. Bushings 134 (one of which is shown in FIG. 12) are disposed around the axles 122, 124, 126 to keep the wheels 110 mounted on a same axle 122, 124 or 126 spaced apart from each other.

The side frame members 56 are provided with vertical extensions 136 disposed forwardly of the leg 62 and extending above the track 106. An axle 138 is connected to and extends between the two extensions 136. Wheels 140 are rotationally mounted on the axle 138 so as to roll on an external surface of the track 106 laterally outwardly of the external lugs 112, thereby applying a downward pressure on the track 106. A bushing 142 is disposed around the axle 138 to keep the wheels 140 spaced apart from each other.

A braking system of the track assembly 54 will now be described in detail. The braking system is disposed on a right side of the track assembly 54, but it is contemplated that it could be mounted on the left side of the track system. The braking system includes a housing 144 rotationally mounted on the right bushing 117. As previously mentioned, the right bushing 117 is mounted on the axle 116 of the sprocket wheel 108. As best seen in FIGS. 10 and 11, the housing 144 is disposed laterally between the right side frame member 56 and the sprocket wheel 108. The housing 144 defines an arm 146 extending upwardly from the axle 116. An upper end of the arm 146 defines an opening 148 through which a fastener (not shown) is inserted to connect a ball joint 150 to the arm 146. A rigid connection member in the form of a rod 152 is connected to the ball joint 150 and extends rearwardly therefrom to another ball joint 154. It is contemplated that the rod 152 could be replaced by other types of bars or rigid connection member. The ball joint 154 is connected to an upper end of an arm 156. The arm 156 extends upwardly from the axle 124. The arm 156 is connected to the axle 124 so as to be rotationally fixed relative to the axle 124. It is contemplated that the arm 156 could be integrally formed with the axle 124.

It is contemplated that the arms 146 and 156 could extend downwardly from their respective axles 116 and 124. It is contemplated that the ball joints 150, 154 could be replaced with other types of connectors. It is also contemplated that the rod 152 could be connected directly to the arms 146, 156. As can be seen in FIGS. 10 and 11, the sprocket wheel 108 defines a brake drum 158. A brake pad assembly 160 is received inside the brake drum 158. The brake pad assembly 160 includes brake pads 162, spring(s) (not shown) biasing the brake pads 162 away from the brake drum 158, a mechanically actuated cam (not shown) for biasing the brake pad 162 against the brake drum 158, and other components typically found in brake pad assemblies. The brake pad assembly 160 is connected to the housing 144 such that when the brake pads 162 are biased against the brake drum 158, the torque generated is transferred to the housing 144. The mechanically actuated cam is connected to and activated by a lever arm 164 (FIG. 8) pivotally mounted on an outer side of the housing 144. The end of the lever arm 164 is connected to an end of a cable 166. The other end of the cable 166 is connected to a brake lever 26 (FIG. 1) provided on the right side of the handlebar 20. Braking of track assembly 54 is effected by pressing the brake lever 26 as will be described below. It is contemplated that the two brake levers 26, 168 could be replaced by a single brake lever effecting the braking of the track assemblies 54 and the track 22. It is contemplated that the cable 166 could be replaced by an electric or hydraulic actuator actuating the lever arm 164 in response to actuation of the brake lever 26. It is also contemplated that the cable 166 could be connected to an electric or hydraulic actuator pulling the cable 166 in response to actuation of the brake lever 26. It is contemplated that when an electric or hydraulic actuator is provided that the braking system could also be provided with an electronic controller and sensors to make it operated like an anti-lock braking system (ABS). It is also contemplated that the brake drum 158 could be replaced by a brake disk connected to or formed by the sprocket wheel 108 and that the brake pad assembly 160 could be replaced by a brake caliper assembly. It is also contemplated that the housing 144, brake drum 158, and brake pad assembly could be alternatively provided on one of the axles 122, 126 and a corresponding one of the wheels 110.

To brake the track assembly 54, the rider of the snowmobile 10 pulls on the brake lever 26. As a result, the cable 166 pulls on the lever 164, which turns the mechanically actuated cam of the brake pad assembly 160. The cam pushes the brake pads 162 against the brake drum 158, thus braking the sprocket 108, which in turn brakes the track 106. The braking torque generated is transferred via the arm 146, ball joint 150, rod 152 and ball joint 154 to the arm 156. As mentioned above, the arm 156 is rotationally fixed relative to the axle 124 that is rotationally fixed relative to the leg 152. As such, a torque countering at least in part the braking torque generated about the axle 116 of the sprocket wheel 108 is generated about the axle 124. This counter torque counters, at least in part, the tendency that the track assembly 54 would otherwise have of rotating about the axle 124 when the brake system is actuated.

Figure 13:
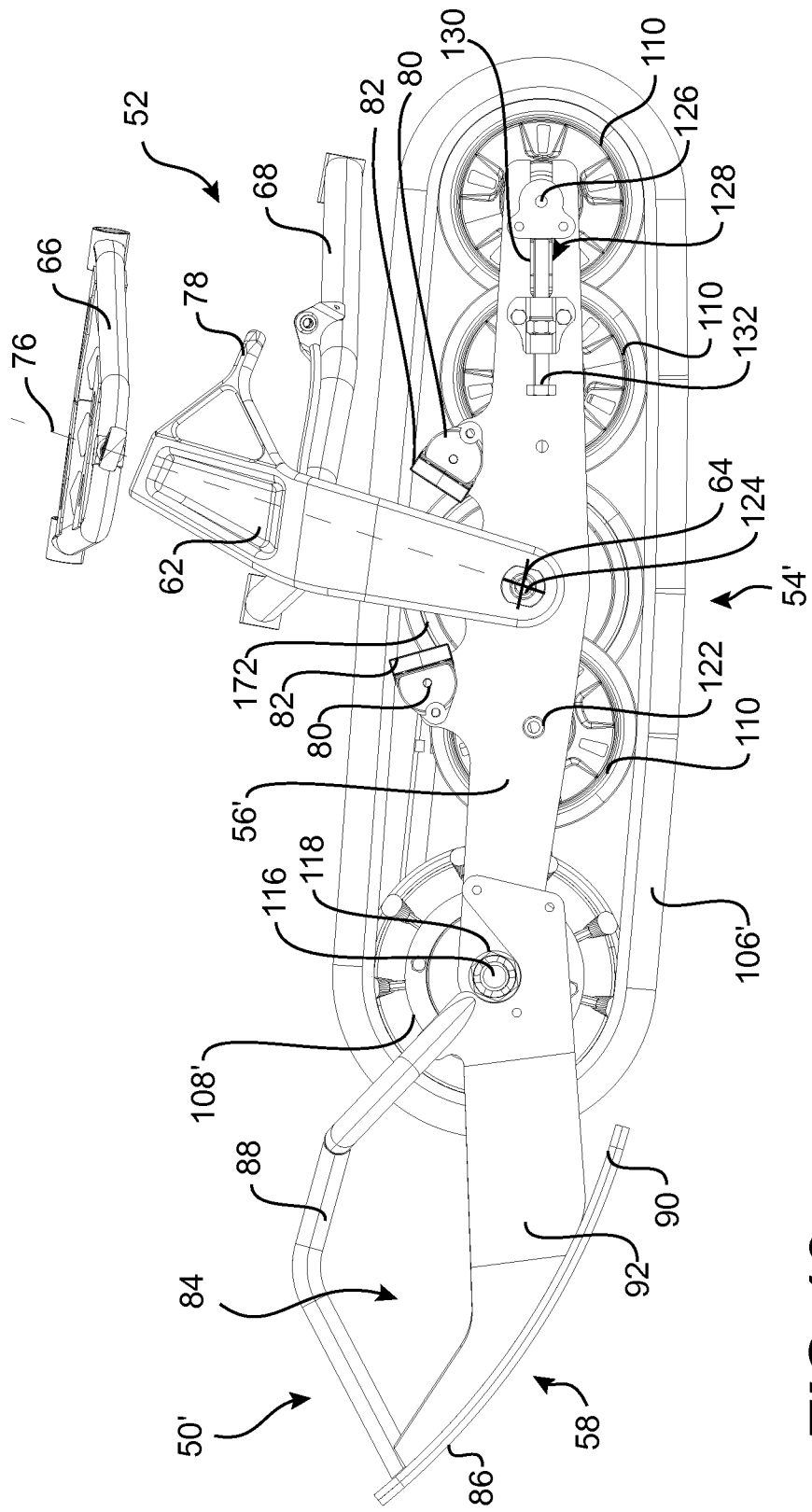
FIG. 13 is a left side elevation view of an alternative implementation of a left ski and front track assembly of the snowmobile of FIG. 1.
Figure 14:
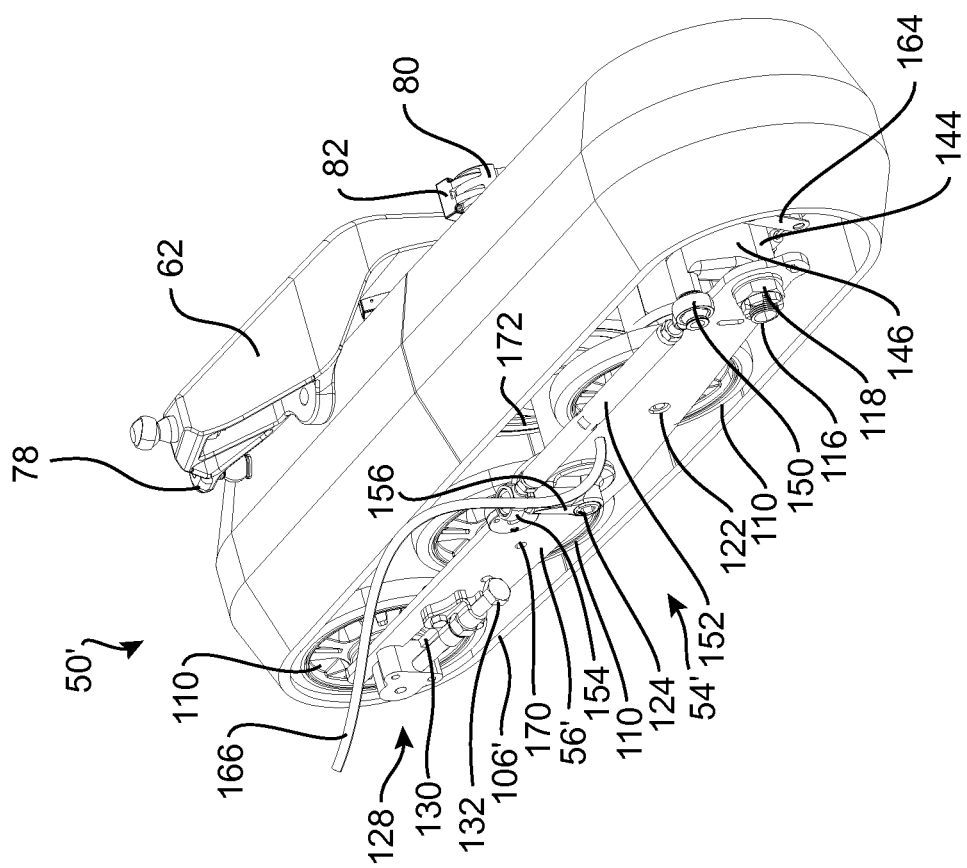
FIG. 14 is a perspective view taken from a front, right side of the assembly of FIG. 13.
Figure 15:
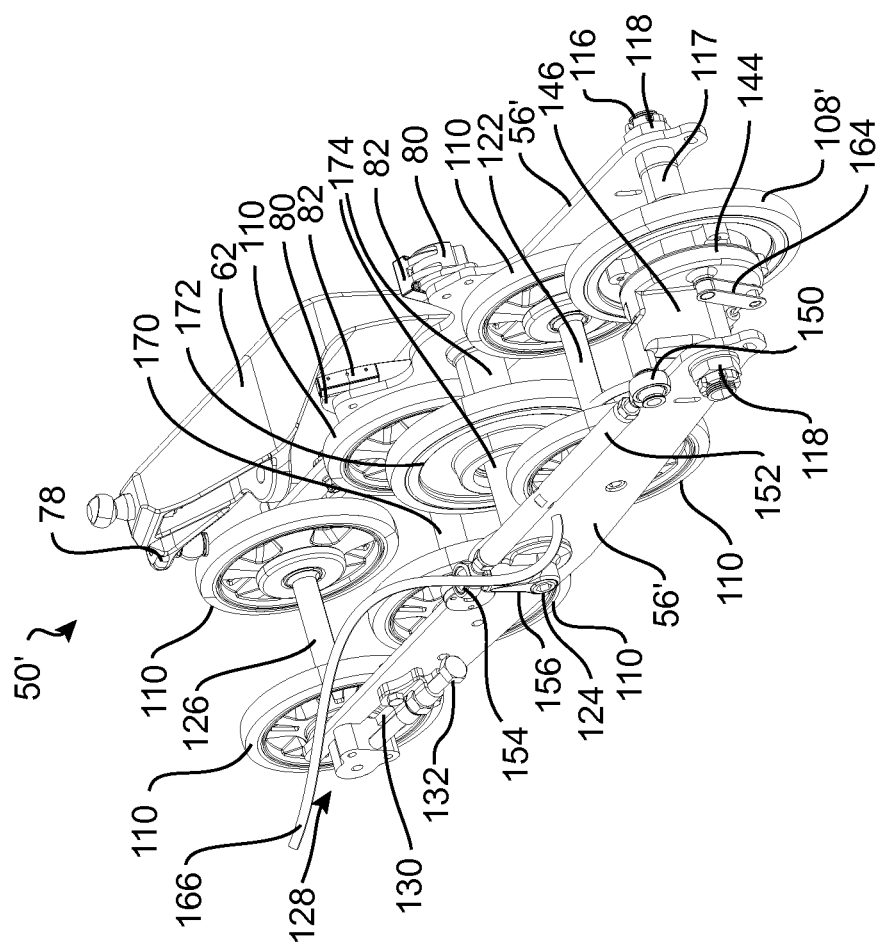
FIG. 15 is a perspective view taken from a front, right side of the assembly of FIG. 13, with the track removed.

Turning now to FIGS. 13 to 15 an alternative implementation of a left ski and front track assembly 50' of the snowmobile 10 will be described. For simplicity, elements of the ski and front track assembly 50' that are similar to those of the ski and front track assembly 50 described above have been labeled with the same reference numerals and will not be described again in detail herein.

The ski and front track assembly 50' is not provided with a rear ski element 60 and a bracket 78 described above. However, it is contemplated that one or both of these could be provided. The track assembly 54' has a side frame members 56' that are similar to the side frame members 56 described above except that they are not provided with the extensions 138. As such, the track assembly 54' also does not have the wheels 140 and their associated elements. The track assembly 54' includes a track 106', which as shown, is free of external and internal lugs. However, it is contemplated that the track 106' could have external lugs.

The sprocket wheel 108 described above is replaced by a wheel 108'. The wheel 108' has a larger diameter than the wheels 110. In the track assembly 54', the middle wheels 110 described above are rotationally mounted on an axle 170 disposed rearwardly of the axle 124. The axle 170 is connected between the two side frame members 56'. A wheel 172 is rotationally mounted to the axle 124. The wheel 172 has a larger diameter than the wheels 110 such that a top and bottom of the wheel 172 contact the internal side of the track 106'. Bushings 174 maintain the wheel 172 laterally centered relative to the track 106'.

The ski and front track assembly 50' has the same braking system as the ski and front track assembly 50 described above.

Turning now to FIGS. 16 to 19 an alternative implementation of a left ski and front track assembly 50" of the snowmobile 10 will be described. For simplicity, elements of the ski and front track assembly 50" that are similar to those of the ski and front track assembly 50 and 50' described above have been labeled with the same reference numerals and will not be described again in detail herein.

Figure 17:
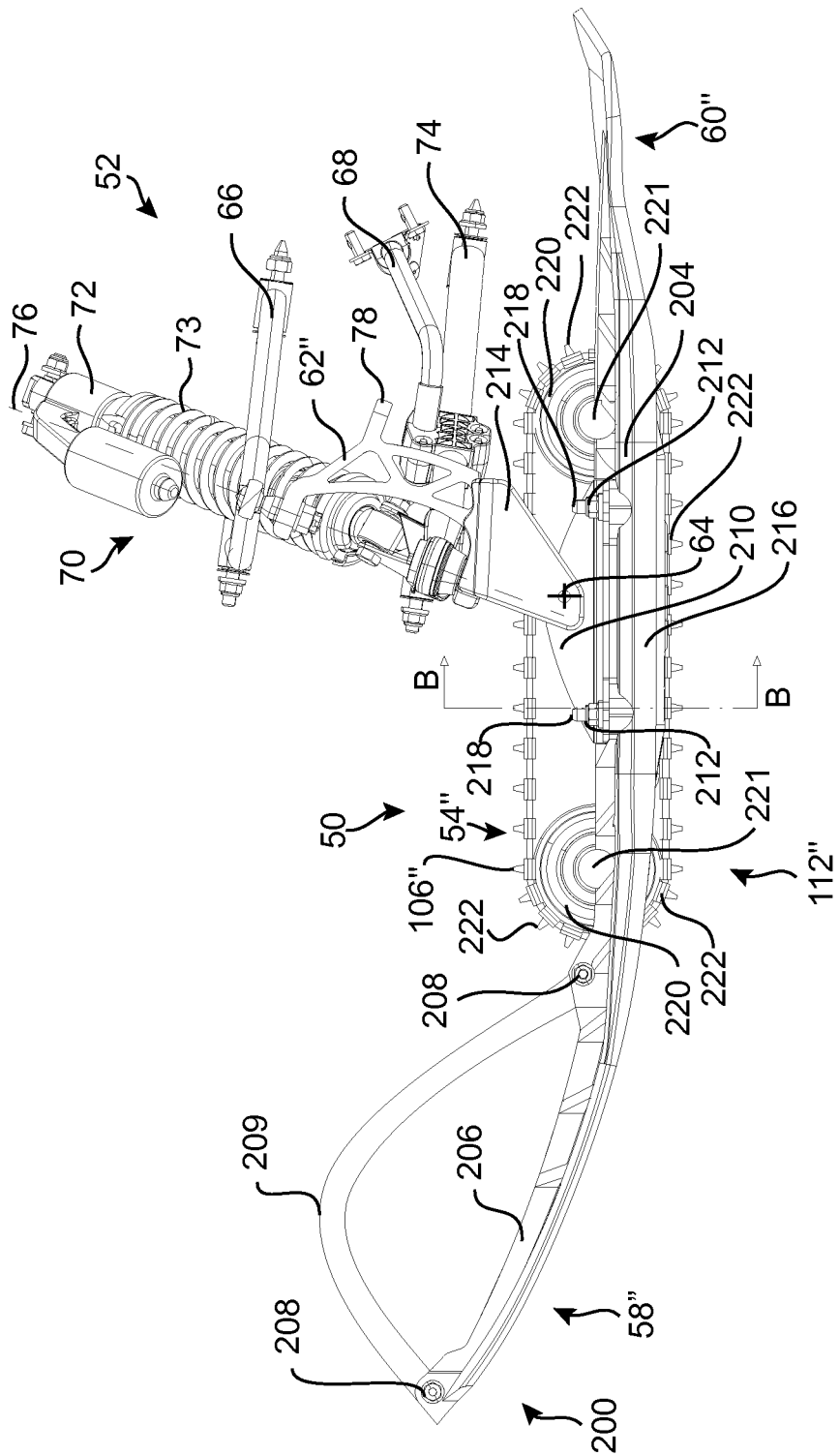
FIG. 17 is a left side elevation view of the assembly of FIG. 16.

The ski and front track assembly 50" includes a ski 200 and a front track assembly 54". The ski 200 defines an aperture 202 (FIG. 18) to receive the track assembly 54" therein. The ski 200 has front and rear ski elements 58" and 60" that extend forwardly and rearwardly of the track assembly 54" respectively. The ski 200 also has two side portions 204 located on each side of the track assembly 54". As such, the track assembly 54" is surrounded on all sides by the ski 200. The front ski element 58", the rear ski element 60", and the two side portions 204 are integrally formed. It is contemplated that the front ski element 58", the rear ski element 60", and the two side portions 204 could be connected to each other by other means. The front ski element 58" is upturned and has two generally longitudinally extending ridges 206. Front and rear fasteners 208 extend through both ridges 206 as shown. The fasteners 208 are provided to attach a handle 209 (shown only in FIG. 17) to the ski 200. Each side portion 204 of the ski 200 has a bracket 210 connected thereto by nuts 212 as will be described below. The track assembly 54" is located laterally between the brackets 210. A fastener (not shown) pivotally connects upwardly extending portions of the brackets 210 to downwardly extending tabs 214 of a leg 62" about the axis 64 (FIG. 17). The central and upper portions of the leg 62" connect the ski and front track assembly 50" to the suspension assembly 52 in a manner similar to the one described above with respect to the leg 62.

Figure 18:
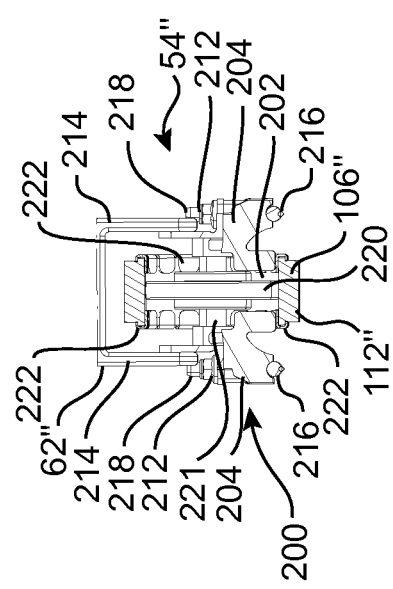
FIG. 18 is a cross-sectional view of the assembly of FIG. 16, taken through line B-B in FIG. 17.
Figure 19:
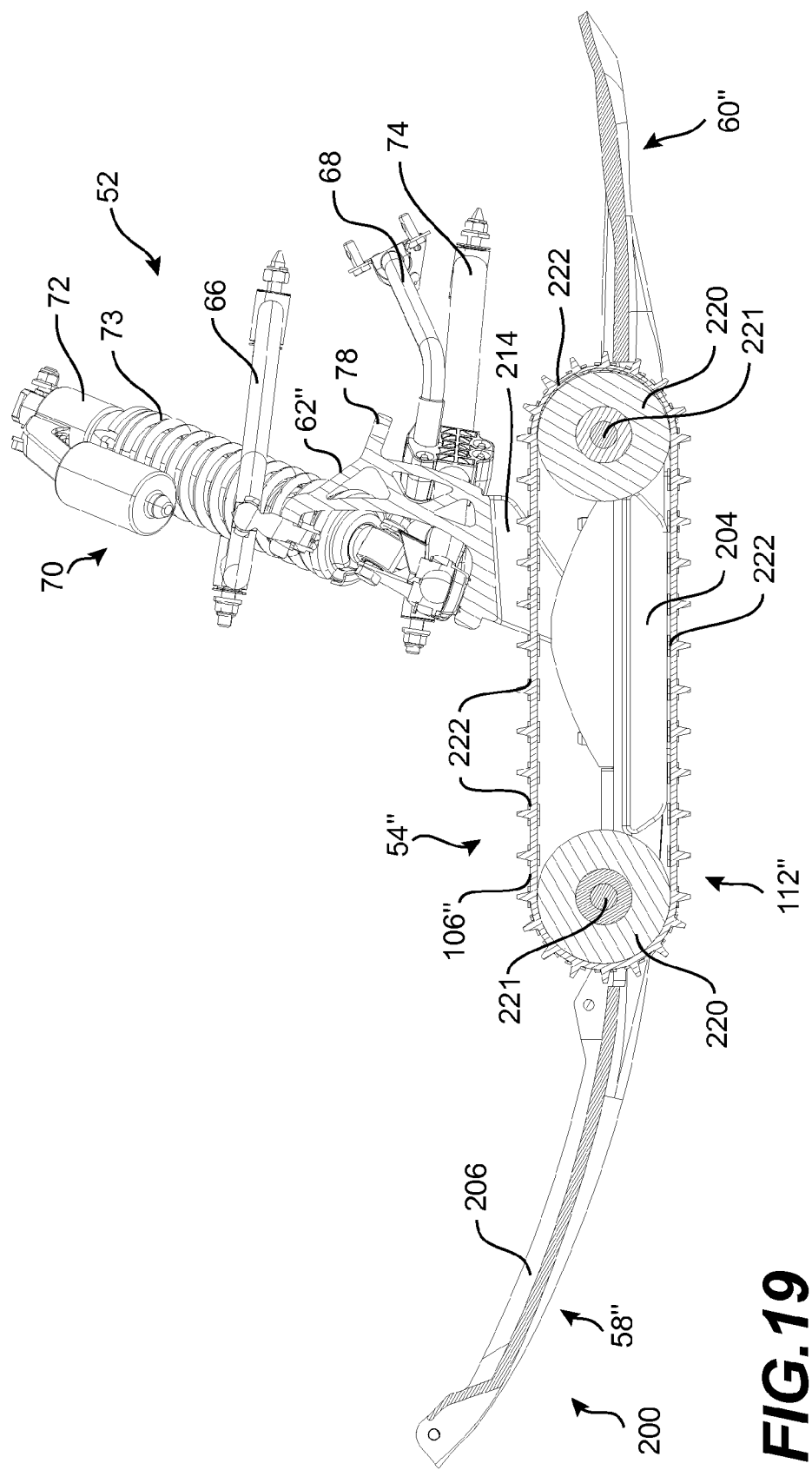
FIG. 19 is a longitudinal cross-section of the assembly of FIG. 16.
Figure 20:
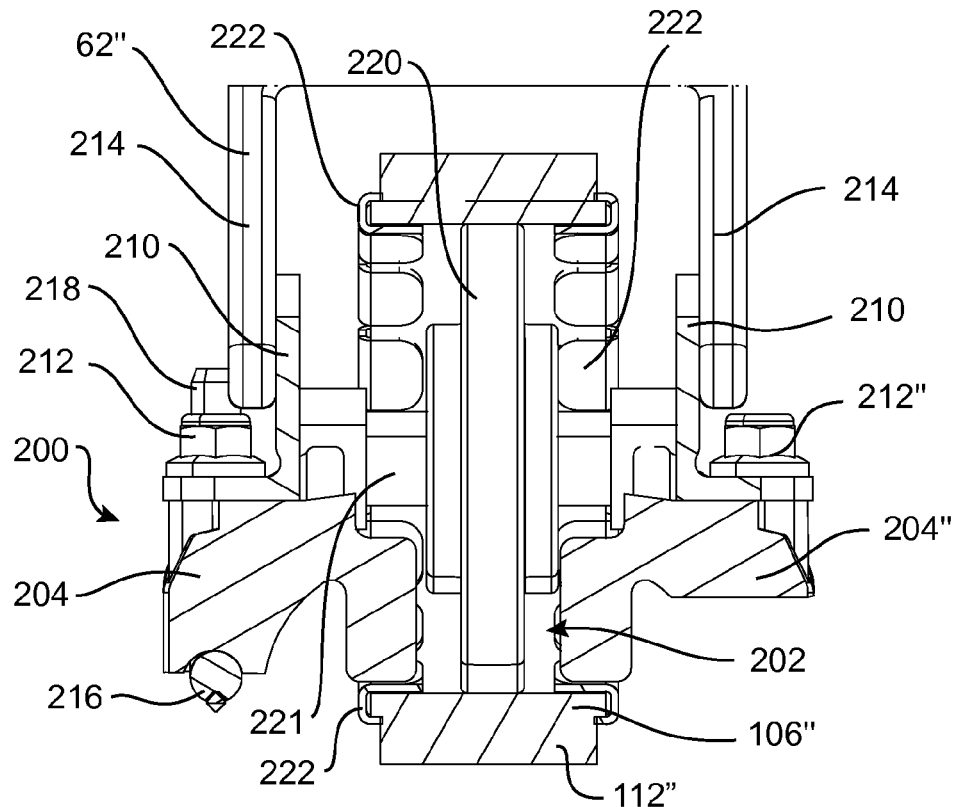
FIG. 20 is a lateral cross-section of an alternative implementation of the assembly of FIG. 16.
Figure 21:
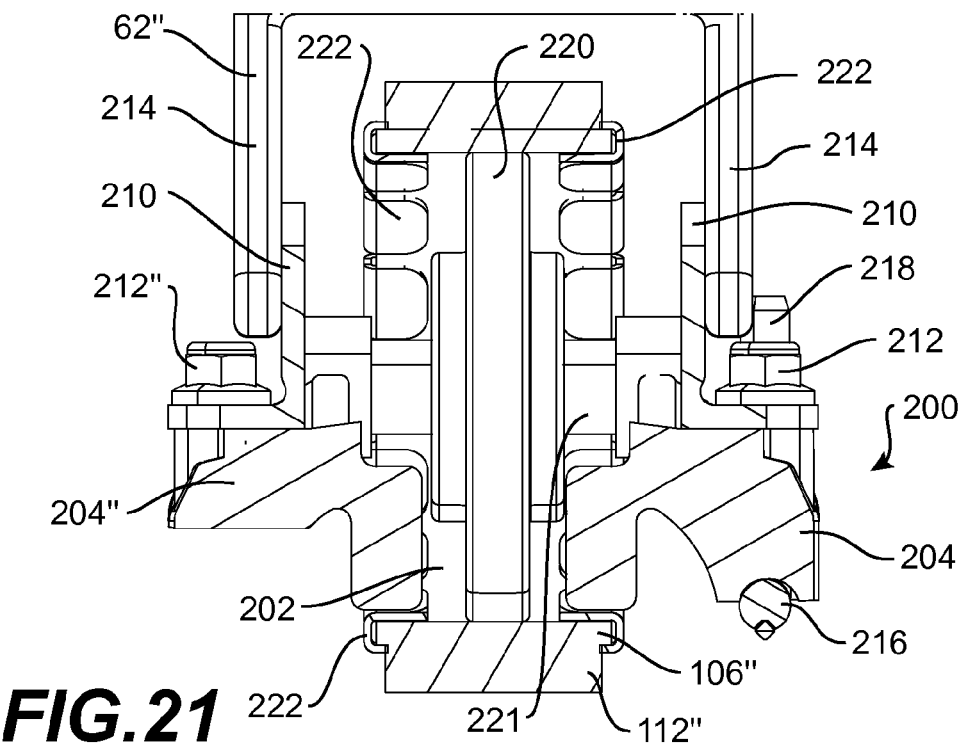
FIG. 21 is a lateral cross-section of another alternative implementation of the assembly of FIG. 16.

As best seen in FIG. 18, each one of the side portions 204 is provided with a runner 216 on a bottom side thereof. The runners 216 each have two upwardly extending threaded rods 218 passing through their corresponding side portions 204 and brackets 210. The nuts 212 are fastened onto the rods 218 above the brackets 210 to connect the runners 216 and the brackets 210 to their respective side portions 204. It is contemplated that the ski 200 could only have one runner 216. As can be seen in an alternative implementation of the ski and front track assembly 50"' shown in FIG. 20, the ski 200 has a left side portion 204 having a runner 216 and a right side portion 204" without a runner 216 and having a flat bottom. As can be seen in another alternative implementation of the ski and front track assembly 50" shown in FIG. 21, the ski 200 has a right side portion 204 having a runner 216 and a left side portion 204" without a runner 216 and having a flat bottom. As can be seen in FIGS. 20 and 21, on the side portion 204" that does not have the runner 216, the nuts 212 have been replaced with threaded fasteners 212" to connect the corresponding bracket to the side portion 204"

The track assembly 54" includes an endless track 106" disposed around two wheels 220. It is contemplated that there could be more than two wheels 220. As the snowmobile 10 moves forward or backward, the track 106" turns around the wheels 220. The wheels 220 are rotationally mounted on axles 221 that are connected to the ski 200.

The track 106" has a row of external lugs 112" disposed on an outer side thereof. The external lugs 112" each have a trapezoidal cross-section and are equally spaced apart from each other. It is contemplated that there could be more than one row of external lugs 112", that there could be more than one shape of external lugs 112", and that the spacing between the external lugs 112" could vary. The track 106" is vertically positioned and the height of the external lugs 112" selected such that the external lugs 112" at the bottom of the track 106" extends about 1 inch (2.54 cm) below the runners 216.

A cleat 222 is connected to each one of the external lugs 112". For clarity, only some of the cleats 222 have been labeled in the figures. Each cleat 222 has an aperture used to insert each cleat 222 over its corresponding external lug 112" such that each cleat 222 rests on the external side of the track 106". Once a cleat 222 is inserted over its corresponding external lug 112", the ends of each cleat 222 are bent around the edges of the track 106" so as to extend along the internal side of the track 106" as can be seen in FIG. 18. As can also be seen in FIG. 18, the central portion of the aperture 202 in the ski 200 is narrower than the track 106". As such, the ends of the cleats 222 located on the bottom of the track 106" abut the bottom of the side portions 208. This provides rigidity to the portion of the track 106" that is in contact with the ground.

Figure 22:
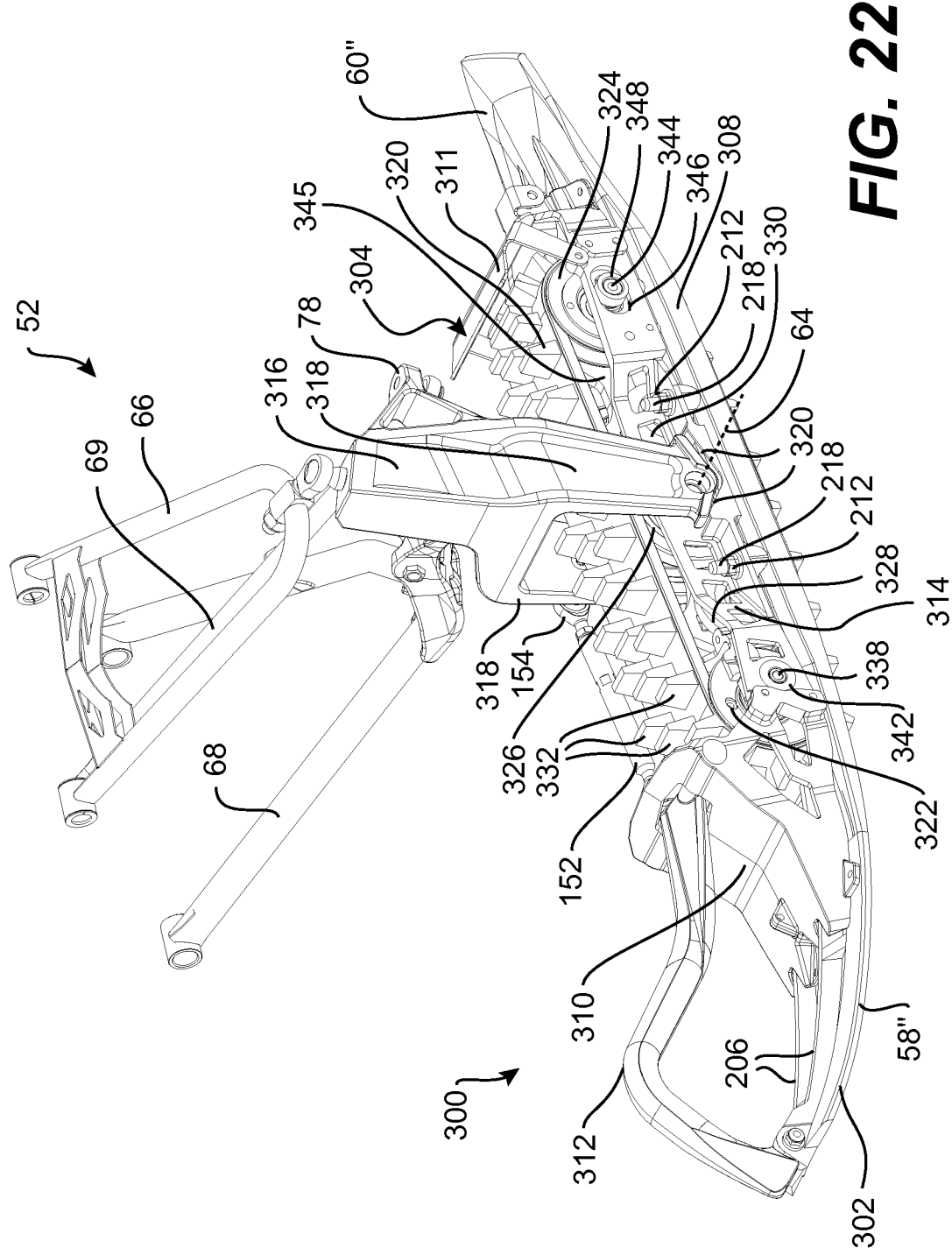
FIG. 22 is a perspective view taken from a front, left side of another alternative implementation of a left ski and front track assembly of the snowmobile of FIG. 1.
Figure 23:
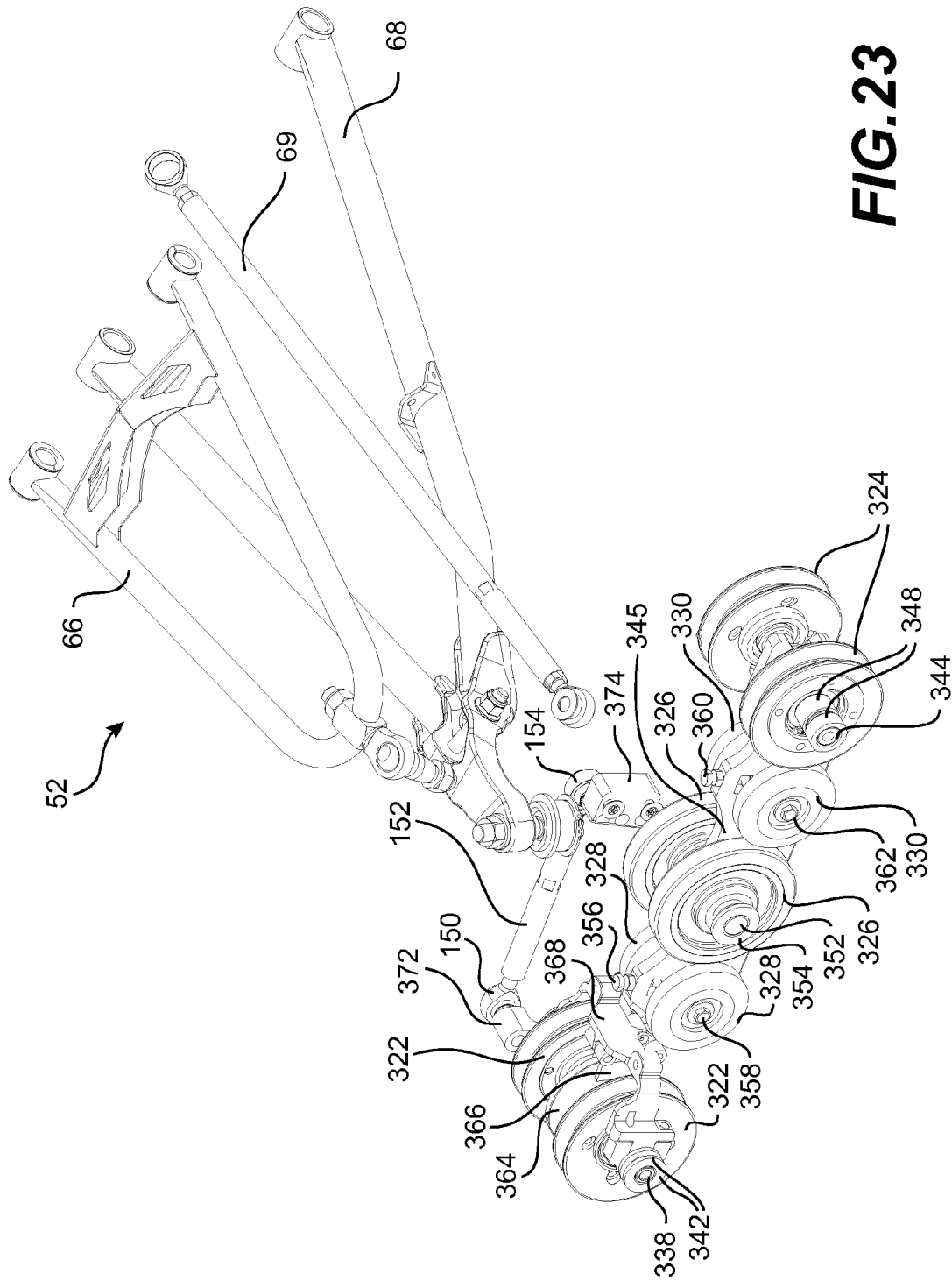
FIG. 23 is a perspective view taken from a rear, left side of the assembly of FIG. 22, without the ski and the track.
Figure 24:
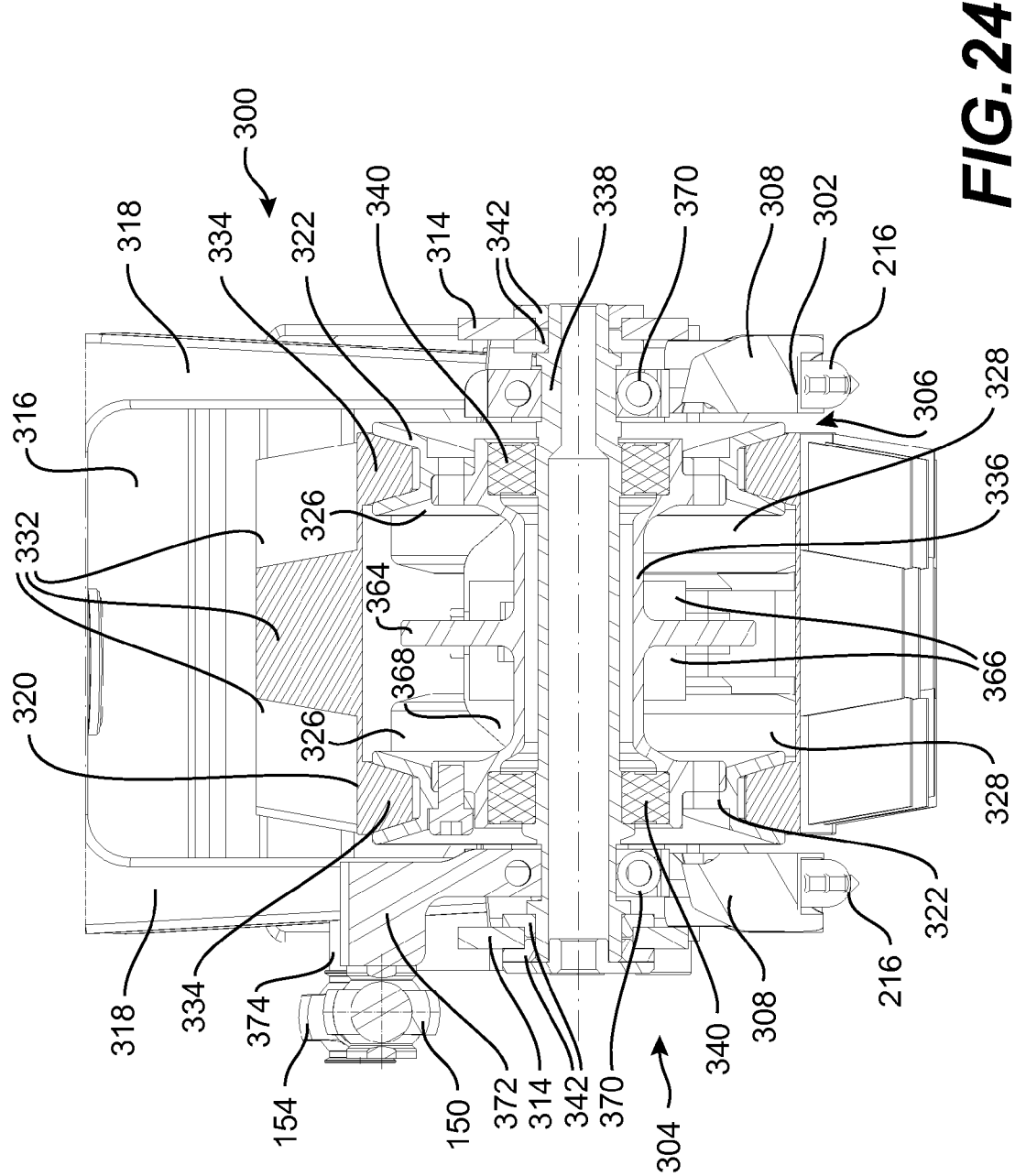
FIG. 24 is a cross-sectional view of the assembly of FIG. 22 taken through the front axle of the assembly.

Turning now to FIGS. 22 to 24 an alternative implementation of a left ski and front track assembly 300 of the snowmobile 10 will be described. For simplicity, elements of the ski and front track assembly 300 that are similar to those of the ski and front track assembly 50, 50' and 50" described above have been labeled with the same reference numerals and will not be described again in detail herein.

The ski and front track assembly 300 includes a ski 302 and a front track assembly 304. The ski 302 defines an aperture 306 (FIG. 24) to receive the track assembly 304 therein. The ski 302 has front and rear ski elements 58" and 60" that extend forwardly and rearwardly of the track assembly 304 respectively. The ski 302 also has two side portions 308 located on each side of the track assembly 304. As such, the track assembly 304 is surrounded on all sides by the ski 302. The front ski element 58", the rear ski element 60", and the two side portions 308 are integrally formed. It is contemplated that the front ski element 58", the rear ski element 60", and the two side portions 308 could be connected to each other by other means. A cover 310 is fastened to the front ski element 58" and the front track assembly 304. The cover 310 covers a front portion of the front track assembly 304. A cover 311 is fastened to the rear ski element 60" and the front track assembly 304. The cover 311 covers a rear portion of the front track assembly 304. The front ski element 58" is upturned and has two generally longitudinally extending ridges 206. A handle 312 is fastened at its front to the front of the ridges 206 and at its rear to the cover 310.

Each side portion 308 of the ski 302 is fastened by nuts 212 to horizontal portions of the side frame members 314 of the track assembly 304. As best seen in FIG. 24, each one of the side portions 308 is provided with a runner 216 on a bottom side thereof. The runners 216 each have two upwardly extending threaded rods 218 passing through their corresponding horizontal portions of the side frame members 314. The nuts 212 are fastened onto the rods 218 above the horizontal portions of the side frame members 314 to connect the runners 216 and the horizontal portions of the side frame members 314 to their respective side portions 308. It is contemplated that the ski 302 could only have one side portion 308.

A leg 316 has a pair of downwardly extending tabs 318. The side frame members 314 of the track assembly 304 are disposed between the tabs 318. Each tab 318 is pivotally connected to its corresponding side frame member 314 about a generally horizontal axis 64. It is contemplated that the leg 316 could have only one tab 318. The suspension assembly 52 is connected to the leg 316. The side frame members 314 have angled surfaces 320 that act as stoppers to limit the pivoting of the ski and front track assembly 304 about the axis 64.

The track assembly 54 includes an endless track 320. The endless track 320 is disposed around a pair of front pulleys 322, a pair of rear pulleys 324, a pair of central wheels 326, front idler wheels 328 and rear idler wheels 330. It is contemplated that there could be more or less wheels and pulleys. As the snowmobile 10 moves forward or backward, the track 320 turns around the pulleys 322, 324 and the wheels 326, 328, 330. The track 320 has three rows of external lugs 332 (only some of which are labeled for clarity) disposed on an outer side thereof. The external lugs 332 each have the same shape. In each row of externals lugs 332, the lugs 332 are equally spaced apart from each other. As can be seen the external lugs 332 of the left and right rows are longitudinally aligned with each other and the external lugs 332 of the central row are longitudinally offset from those of the other two rows. It is contemplated that there could be more or less than three rows of external lugs 332, that there could be more than one shape of external lugs 332, and that the spacing between the external lugs 332 could vary. As best seen in FIG. 24, the track 320 also has two belts 334 disposed on an inner side thereof. The belts 334 each have a trapezoidal cross-section. The belts 334 are received in the pulleys 322, 324.

The front pulleys 322 are disposed at a front of the track assembly 304. As best seen in FIG. 24, the pulleys 322 are mounted on and fastened to a hollow shaft 336. The hollow shaft 336 is rotatably mounted on an axle 338 via bearings 340. The axle 338 extends through the side frame members 314. Retaining disks 342 are disposed between the axle 338 and the side frame members 314. A bolt (not shown) passes through the axle 338 and has a nut (not shown) that is fastened on its end to fasten the axle 338 to the side frame members 314. The front pulleys 322 roll and engage the belts 324 as the track 320 turns.

The rear pulleys 324 are disposed at a rear of the track assembly 304. The pulleys 324 rotatably mounted on an axle 344 via bearings (not shown). The axle 344 passes through a centrally positioned rail 345. The axle 344 extends through oblong openings 346 in the side frame members 314. Retaining disks 348 are disposed between the axle 344 and the side frame members 314. A bolt (not shown) passes through the axle 344 and has a nut (not shown) that is fastened on its end to fasten the axle 344 to the side frame members 314. The tension in the endless track 320 can be adjusted by changing the position of the axle 344 in the slot of the rail 345 and the openings 346. The rear pulleys 324 roll and engage the belts 324 as the track 320 turns.

The two central wheels 326 are rotationally mounted via bearing 350 (see the implementation of FIG. 25) on an axle 352 disposed between the axle 338 and 344. The wheels 326 have a slightly smaller diameter than the pulleys 322, 324. The axle 352 extends through the rail 345 and the two side frame members 314. The axle 352 is coaxial with the axis 64. A fastener 353 (see the implementation of FIG. 25) fastens the axle 352 to the rail 345. The axle 352 is connected to the tabs 318 of the leg 316. Retaining disks 354 are disposed between the axle 352 and the side frame members 314. A bolt (not shown) passes through the tabs 318 and the axle 352 and has a nut (not shown) that is fastened on its end to fasten the axle 352 to the leg 316. The central wheels 326 are disposed laterally inwardly of the belts 324. The outer sides of the wheels 326 abut the inner sides of the belts 324 at the top and bottom of the track 320. The central wheels 326 roll along the inner surface of the bottom of the track 320 as the track 320 turns.

The front idler wheels 328 are rotationally mounted via bearings (not shown) on an axle (not shown) passing through the rail 345 and disposed between the axles 338 and 352. The idler wheels 328 have a smaller diameter than the central wheels 326. A fastener 356 fastens the axle to the rail 345. A bolt 358 passes through the axle and has a nut (not shown) that is fastened on its end to retain the idler wheels 328 on the axle. The idler wheels 328 are disposed laterally inwardly of the belts 324 and are laterally aligned with the central wheels 326. The outer sides of the idler wheels 328 abut the inner sides of the belts 324 at the bottom of the track 320. The idler wheels 328 roll along the inner surface of the bottom of the track 320 as the track 320 turns.

The rear idler wheels 330 are rotationally mounted via bearings (not shown) on an axle (not shown) passing through the rail 345 and disposed between the axles 344 and 352. The idler wheels 330 have a smaller diameter than the central wheels 326. A fastener 360 fastens the axle to the rail 345. A bolt 362 passes through the axle and has a nut (not shown) that is fastened on its end to retain the idler wheels 330 on the axle. The idler wheels 330 are disposed laterally inwardly of the belts 324 and are laterally aligned with the central wheels 326. The outer sides of the idler wheels 330 abut the inner sides of the belts 324 at the bottom of the track 320. The idler wheels 330 roll along the inner surface of the bottom of the track 320 as the track 320 turns.

A braking system of the track assembly 304 will now be described with respect to FIGS. 23 and 24. The braking system is disposed on a right side of the track assembly 304, but it is contemplated that it could be mounted on the left side of the track system. The braking system includes a brake disk 364 integrally formed with the hollow shaft 336. It is contemplated that the brake disk 364 could be separate from the shaft 336 and be fixedly connected to the shaft 336. As can be seen, the brake disk 364 is disposed laterally between the front pulleys 322. Brake calipers 366 are disposed on either side of the brake disk 364 behind the hollow shaft 336. A suitable actuation mechanism, such as, for example, a hydraulic piston, is operatively connected to the brake calipers 366 to allow the calipers 366 to squeeze the brake disk 364 therebetween. The actuation mechanism is operatively connected to the brake lever 26, such that when the driver of the snowmobile 10 actuates the brake lever 26, the brake calipers 366 apply a braking force to the brake disk 364. The brake calipers 366 are held on a bracket 368 rotationally mounted on the axle 338 via bearing 370. When the brake calipers 366 squeeze the brake disk 364, the torque generated is transferred to the bracket 368. The bracket 368 defines an upwardly extending arm 372. An upper end of the arm 372 defines an opening through which a fastener (not shown) is inserted to connect a ball joint 150 to the arm 370. A rigid connection member in the form of a rod 152 is connected to the ball joint 150 and extends rearwardly therefrom to another ball joint 154. The ball joint 154 is connected to an upper end of an arm 374. The arm 374 is connected to the right tab 318 of the leg 316 above the axle 352.

To brake the track assembly 304, the rider of the snowmobile 10 pulls on the brake lever 26. As a result, the actuation mechanism causes the calipers 366 the calipers 366 to squeeze the brake disk 364 therebetween, thus braking the hollow shaft 336 and the front pulleys 322, which in turn brakes the track 320. The braking torque generated is transferred via the arm 372 of the bracket 368, ball joint 150, rod 152 and ball joint 154 to the arm 374. As mentioned above, the arm 374 is fixed relative to the leg 316. As such, a torque countering at least in part the braking torque generated about the axle 338 is generated about the axle 352. This counter torque counters, at least in part, the tendency that the track assembly 304 would otherwise have of rotating about the axle 352 when the brake system is actuated.

Figure 25:
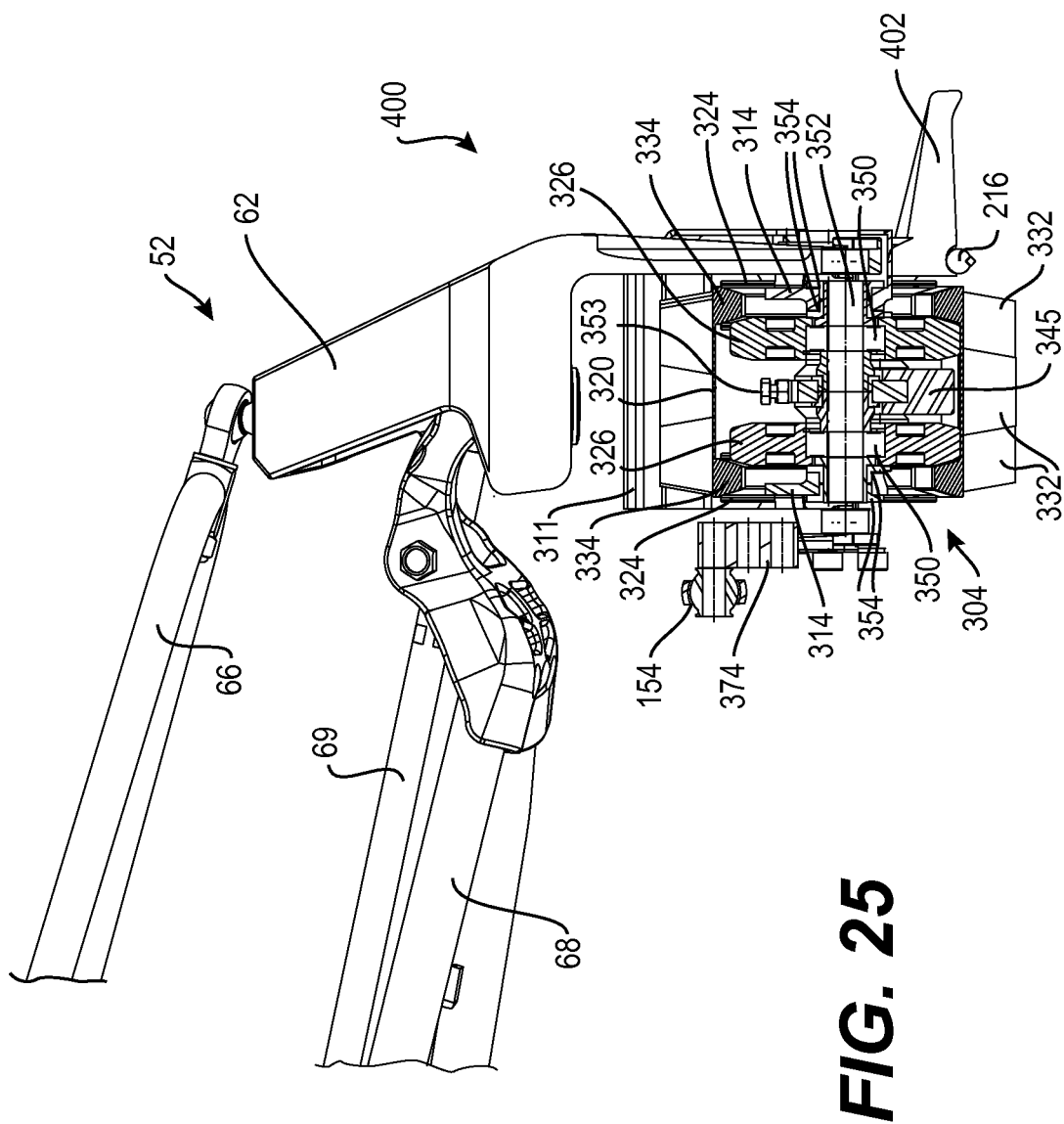
FIG. 25 is a cross-sectional view of an alternative implementation of the assembly of FIG. 22 taken through a central axle thereof.

In an alternative implementation of the ski and front track assembly 300 shown in FIG. 25, a ski and track assembly 400 has a ski 402 disposed to the left of the front track assembly 304. The ski 402 has a single runner 216 disposed on a right side of the ski near the front track assembly 304. As can be seen, the leg 316 has been replaced with the leg 62. In another alternative implementation (not shown), the ski is disposed to the right of the front track assembly 304. In such an implementation, a single runner 216 is disposed on a left side of the ski near the front track assembly 304.

Turning now to FIGS. 26 to 37, an alternative implementation of a left ski and front track assembly 500 of the snowmobile 10 will be described. For simplicity, elements of the ski and front track assembly 500 that are similar to those of the ski and front track assembly 50, 50', 50", 300 and 400 described above have been labeled with the same reference numerals and will not be described again in detail herein.

The ski and front track assembly 500 includes a ski 502 and a front track assembly 504. The ski 502 defines an aperture (not shown) to receive the track assembly 504 therein. The ski 502 has front and rear ski elements 58" and 60" that extend forwardly and rearwardly of the track assembly 504 respectively. The ski 502 also has two side portions 308 located on each side of the track assembly 504. As such, the track assembly 504 is surrounded on all sides by the ski 502. The ski 502 has a cover 506 fastened to the top of the ski elements 58" and 60" and of the side portions 308. It is contemplated that a cover similar to the cover 506 could be provided to the skis described in the other implementations of the ski and front track assemblies described above. The front ski element 58", the rear ski element 60", and the two side portions 308 are integrally formed. It is contemplated that the front ski element 58", the rear ski element 60", and the two side portions 308 could be connected to each other by other means. Each side portion 308 of the ski 502 is fastened by nuts (not shown) to horizontal portions of side frame members 508 of the track assembly 504.

A leg 510 has a pair of downwardly extending tabs 512. The side frame members 508 of the track assembly 504 are disposed between the tabs 512. Each tab 512 is pivotally connected to its corresponding side frame member 508 about a generally horizontal axis 64 (FIG. 27). It is contemplated that the leg 510 could have only one tab 512. The suspension assembly 52 is connected to the leg 510. The side frame members 508 have integrally formed angled surfaces 514 that act as stoppers to limit the pivoting of the ski and front track assembly 500 about the axis 64. It is contemplated that the integrally formed angled surfaces 514 could be replaced by stopper fastened to the side frame members 508.

Figure 33:
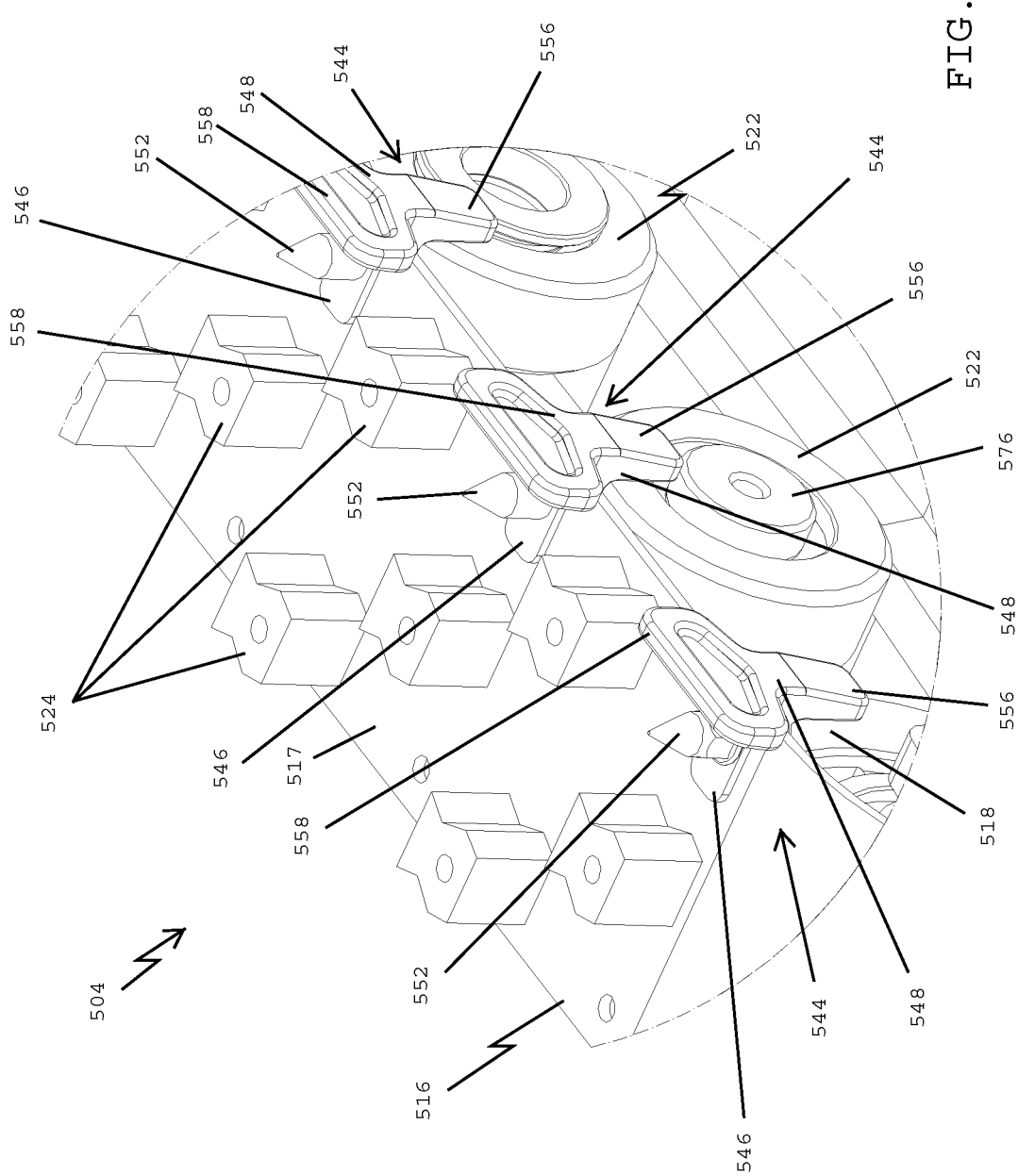
FIG. 33 is a perspective view taken from a front, left side of the front portion of the track assembly of FIG. 31.

The track assembly 504 includes an endless track 516 having a track body 517. The endless track 516 is disposed around a front pulley 518, a rear pulley 520, and three pairs of intermediate wheels 522 (only two of which are shown in FIG. 33) disposed longitudinally between the front and rear pulleys 518, 520. The front pulley 518 acts as a wheel that rolls along the inner side of the endless track 516. It is contemplated that there could be more or less wheels and pulleys. As the snowmobile 10 moves forward or backward, the track 516 turns around the front pulley 518, the rear pulley 520 and the intermediate wheels 522.

The track 516 has three rows of external lugs 524 (only some of which are labeled for clarity) disposed on an outer side of the track body 517. It should be understood that although the external lugs 524 are only shown along certain portions of the outer side of the track body 517, the external lugs 524 are actually present along the entire length of the track body 517. The external lugs 524 each have the same shape. In each row of externals lugs 524, the lugs 524 are equally spaced apart from each other. As can be seen the external lugs 524 of the left and right rows are longitudinally aligned with each other and the external lugs 524 of the central row are longitudinally offset from those of the other two rows. It is contemplated that there could be more or less than three rows of external lugs 524, that there could be more than one shape of external lugs 524, and that the spacing between the external lugs 524 could vary.

Figure 35:
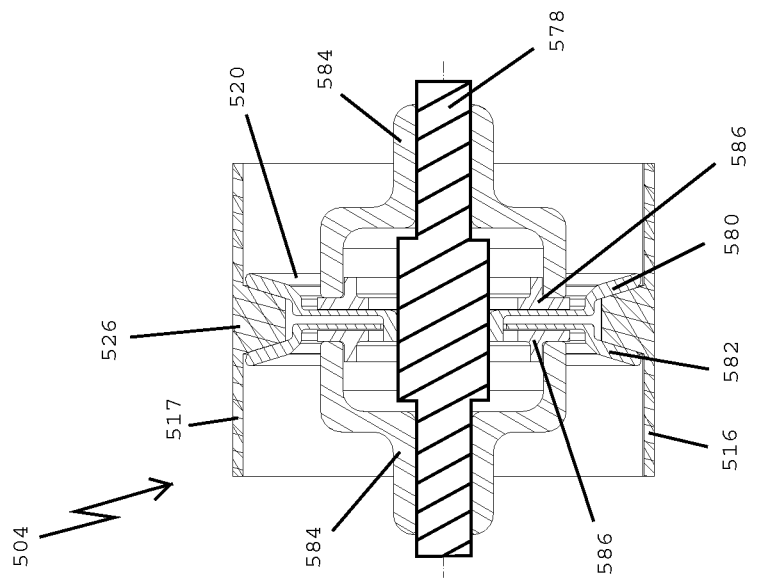
FIG. 35 is a cross-sectional view of the track assembly of FIG. 27 taken through line 35-35 of FIG. 34.
Figure 34:
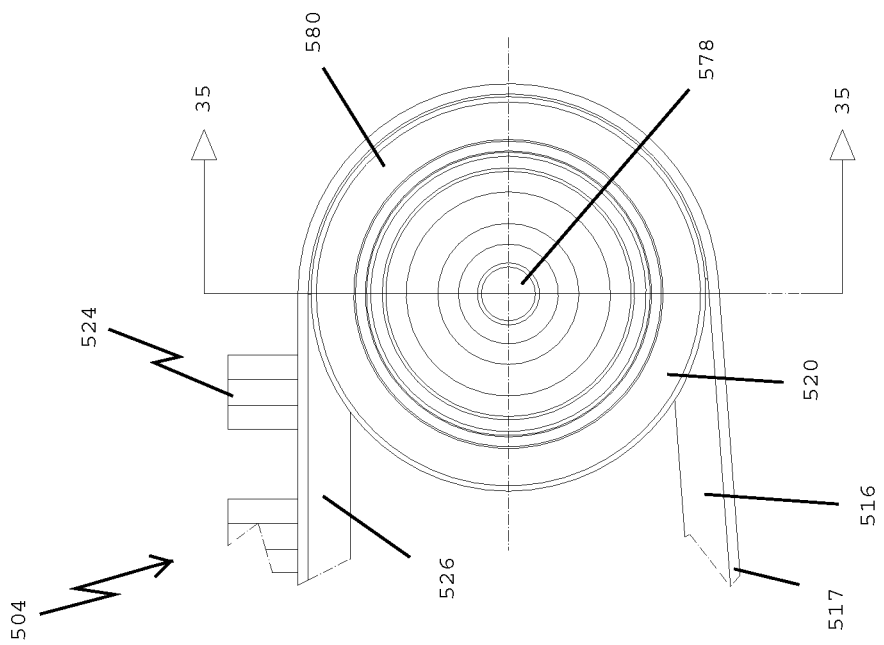
FIG. 34 is a left side elevation view of the rear portion of the track assembly of FIG. 27.

As can be seen in FIG. 28, the track 516 also has a single endless belt 526 disposed on an inner side of the track body 517. The belt 526 is centered between the left and right lateral edges of the track body 517. It is contemplated that the belt 526 could be offset from a center of the track body 517. The belt 526 has a trapezoidal cross-section and is sometimes referred to as a V-belt. The belt 526 is received in the pulleys 518, 520 as can be seen in FIGS. 28 and 35 which helps maintain the lateral alignment of the track 516. Each pair of wheels 522 has one wheel 522 disposed on a left side of the belt 526 and another wheel 522 disposed on a right side of the belt 526. It is contemplated that each pair of wheels 522 could be replaced by a pulley receiving the belt 526 therein.

As best seen in FIGS. 27 and 29, the track 516 has a plurality of cleats 528 connected to the track body 517 on a left side thereof. It is contemplated that the cleats 528 could be connected to the track body 517 of the right side thereof. It is also contemplated that the cleats 528 could be connected to the track body 517 on both the left and right sides of the track body 517. On a right ski and front track assembly 500, the cleats 528 are disposed on a right side of the track body 517. It should be understood that although the cleats 528 are only shown along certain portions of the track body 517, the cleats 528 are actually present along the entire length of the track body 517. As can be seen in FIG. 29, the cleats 528 are longitudinally aligned with the lugs 524 of the central row of lugs 524. The cleats 528 are also disposed laterally between the central row of lug 514 and the left lateral edge of the track body 517. A portion of each of the cleats 528 is disposed laterally between the left row of lugs 524 and the left lateral edge of the track body 517.

Each cleat 528 has an outer portion 530, an inner portion 532, a bolt 534 and a nut 536. The inner portion 532 is disposed on the inner side of the track body 517. The outer portion 532 is disposed on the outer side of the track body 517. The bolt 534 is inserted through the inner portion 532, the track body 517 and the outer portion 530. The nut 536 is then fastened on the portion of the bolt 534 protruding from the outer portion 530, thereby connecting the portions 530, 532 to the track body 517. As can be seen, the nut 536, a portion of the bolt 534, and the outer portion 530 extend outwardly from the outer side of the track body 517. As such, these portions of the cleats 528 penetrate the surface of which the track assembly 504 operates (provided it is not too hard) which can help decrease lateral slipping when the snowmobile 10 turns. Each inner portion 532 has a leg 538 that extends inwardly from the inner side of the track body 517. The leg 538 abuts the right side of the left frame member 508 which helps maintain the lateral alignment of the track 516. It is contemplated that only some of the inner portions 532 could have a leg 538.

FIG. 30 illustrates an alternative type of cleat 540. The cleat 540 is similar to the cleat 528 described above, except that the outer portion 530 has a plate 542 extending from a left side thereof. As can be seen, the plate 542 extends outwardly from the outer side of the track body 517 beside the left lateral edge of the track body 517. It is contemplated that the plate 542 could extends outwardly from the outer side of the track body 517 on a right side of the nut 536. It is contemplated that only some of the outer portions 530 could have a plate 542. It is contemplated that the cleats 540 could be provided on the right side or on both sides of the track body 517.

FIGS. 31 to 33 illustrate another alternative type cleat 544. Each cleat 544 has an outer portion 546, an inner portion 548, and a fastener 550. The outer portion 546 is similar to the outer portion 530 described above. The inner portion 548 is disposed on the inner side of the track body 517. The outer portion 546 is disposed on the outer side of the track body 517. The fastener 550 is inserted through the inner portion 548, the track body 517 and the outer portion 546. A stud 552 is then fastened on the portion of the fastener 550 protruding from the outer portion 546, thereby connecting the portions 546, 548 to the track body 517. Each inner portion 548 has legs 554 and 556 that extend inwardly from the inner side of the track body 517. The left frame member 508 is disposed between the legs 554 and 556 which abut it on both sides and which helps maintain the lateral alignment of the track 516. As can be seen in FIG. 32, the leg 554 is disposed laterally inward (i.e. to the right) of the left edge of the track body 517 and the leg 556 is disposed laterally outward (i.e. to the left) of the left edge of the track body 517. It is contemplated that some of the inner portions 548 could have no legs or only one of the legs 554 or 556. It is also contemplated that all of the inner portions 548 could have only one of the legs 554 or 556. Each inner portion 548 also has an outwardly extending leg 558. As can be seen in FIG. 32, the leg 558 is disposed laterally outward (i.e. to the left) of the left edge of the track body 517. The leg 558 also extends outwardly from the outer side of the track body 517. It is contemplated that only some of the inner portions 548 could have a leg 558. As can be seen, each stud 552 is longitudinally aligned with its corresponding leg 558 and is disposed laterally inward (i.e. to the right) of its corresponding leg 558.

The front pulley 518 is disposed at a front of the track assembly 504. As can be seen in FIG. 28, the pulley 518 is mounted on a bearing 560. A lip of the pulley 518 and a ring 561 maintain the bearing laterally aligned with the pulley 518. The bearing 560 is mounted on and held laterally between a pair of axles 562. As such, the pulley 518 can rotate about the axles 562. The axles 562 extend through slots 564 in the side frame members 508. The ends of the axles 562 are received in mounting blocks 566 that are slidably received between plates 568 (FIG. 27). An adjustment mechanism 570 is connected to the blocks 566. The adjustment mechanism 570 is used to move the axles 562 in the slots 564, thereby adjusting the longitudinal position of the pulley 518. By adjusting the position of the pulley 518, the tension in the track 516 can be adjusted. A bolt 572 passes through the axles 562 and has a nut 574 that is fastened on its end to clamp the axles 562 onto the bearing 560 and fasten the axles 562 to the frame members 508. The front pulley 518 rolls and engages the belt 526 as the track 516 turns.

The wheels 522 are mounted on axles 576 (FIG. 33) connected to the frame members 508 in a manner similar to the wheels 110 described above. As such, the wheels 522 roll along the inner side of the track body 517 and are rotatable relative to the frame members 508.

As best seen in FIG. 35, the rear pulley 520 is disposed at a rear of the track assembly 504. The pulley 520 is mounted on an axle 578 so as to be rotationally fixed relative to the axle 578. The axle 578 passes through the side members 508 and is fixedly connected to them. As a result, the pulley 520 is rotationally fixed relative to the side members 508 and does not roll along the inner side of the track body 514.

Figure 26:
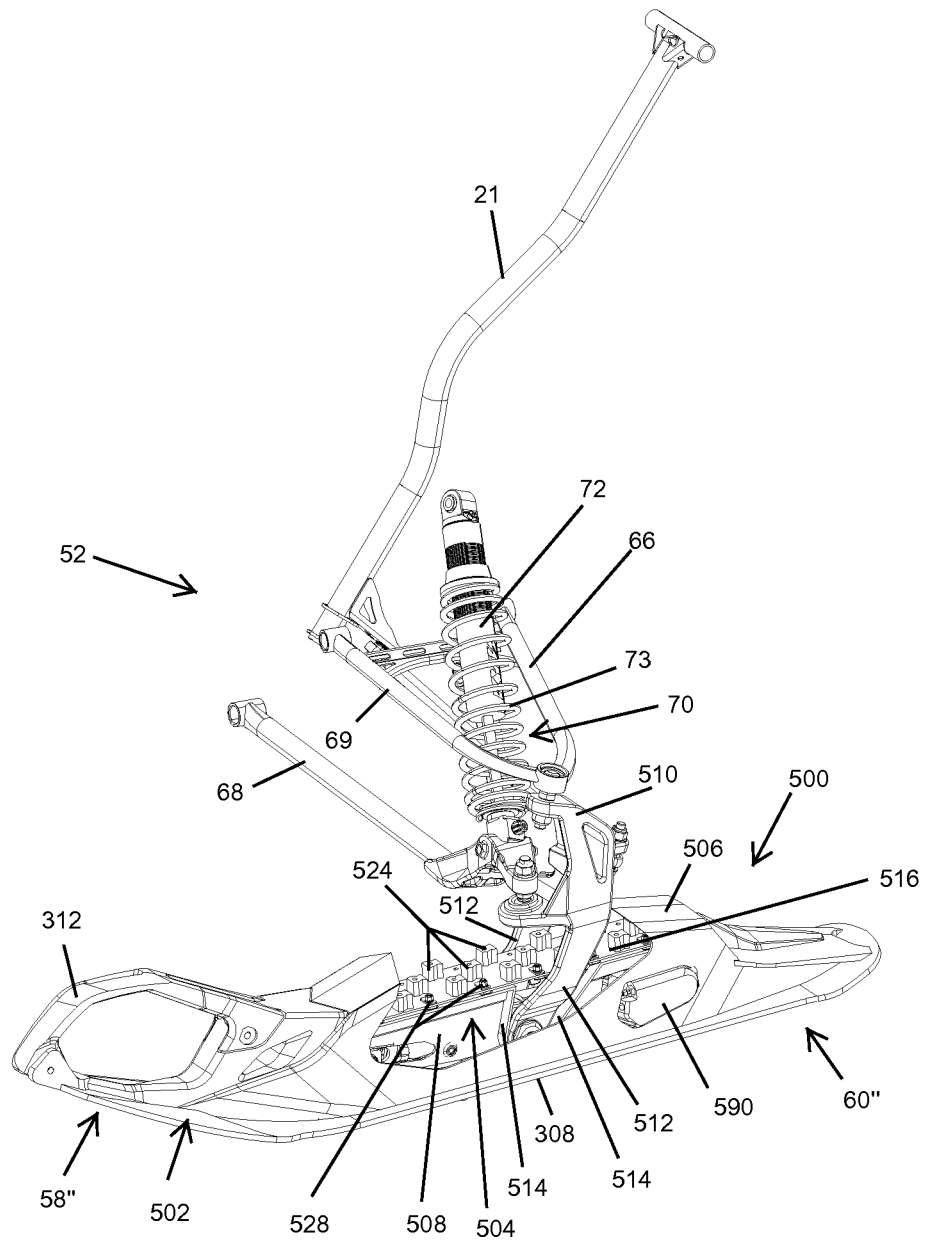
FIG. 26 is a perspective view taken from a front, left side of another alternative implementation of a left ski and front track assembly of the snowmobile of FIG. 1.

An implementation of a brake assembly of the track assembly 504 will now be described with respect to FIGS. 27 and 35. In the illustrated implementation, the pulley 520 includes a left sheave portion 580 and a right sheave portion 582. The left and right sheave portions 580, 582 are rotationally fixed relative to each other and can slide toward or away from each other along the axle 578. When the sheave portions 580, 582 are moved toward each other as shown in FIG. 35 by the brake assembly, as will be described below, the sheave portions 580, 582 squeeze the belt 526 therebetween. The resulting friction brakes the track 516. The brake assembly includes a pair of pistons 584, a pair of brake pads 586, and a hydraulic actuator 588 (schematically illustrated in FIG. 27). The pistons 584 are slidably mounted on the axle 578 on either side of the pulley 520 so as to be movable toward and away from each other. The brake pads 586 are fixedly connected to the laterally inward ends of the pistons 584 such that each brake pad 586 is disposed between its corresponding piston 584 and its corresponding one of the sheave portions 580, 582. The pistons 584 are connected to the hydraulic actuator 588 such that the actuator 588 can move the pistons 584 toward or away from each other. The hydraulic actuator 588 is mounted to the left side frame member 508, but it is contemplated that it could be mounted to the right side frame member 508. A housing 590 is mounted over the hydraulic actuator 588 and is connected to the left side frame member 508. As can be seen in FIG. 26, the housing 590 protrudes from an opening in the cover 506. The hydraulic actuator 588 is connected to a master cylinder (not shown) by a brake line (not shown). The master cylinder is operated by the brake lever 26 of the snowmobile 10. It is contemplated that the hydraulic actuator 588 could be replaced by another type of actuator such as, for example, an electrical actuator. It is also contemplated that the pulley 520 could rotate relative to the frame member 508 and roll along the inner side of the track body 517 when the brake lever 26 is not actuated. It is also contemplated that the brake assembly could be provided at the front of the track assembly 504 to brake the front pulley 518, in which case the pulley 518 would include two sheave portions similar to the sheave portions 580, 582.

To brake the track assembly 504, the rider of the snowmobile 10 pulls on the brake lever 26. In response to the actuation of the brake lever 26, the hydraulic actuator 588 moves the pistons 584 toward each other. As the pistons 584 move toward each other, the brake pads 586 come in contact with their respective sheave portion 580 or 582, which moves the sheave portions 580, 582 toward each other. As a result, the sheave portions 580, 582 squeeze the belt 526 therebetween and the resulting friction brakes the track 516.

Figure 36:
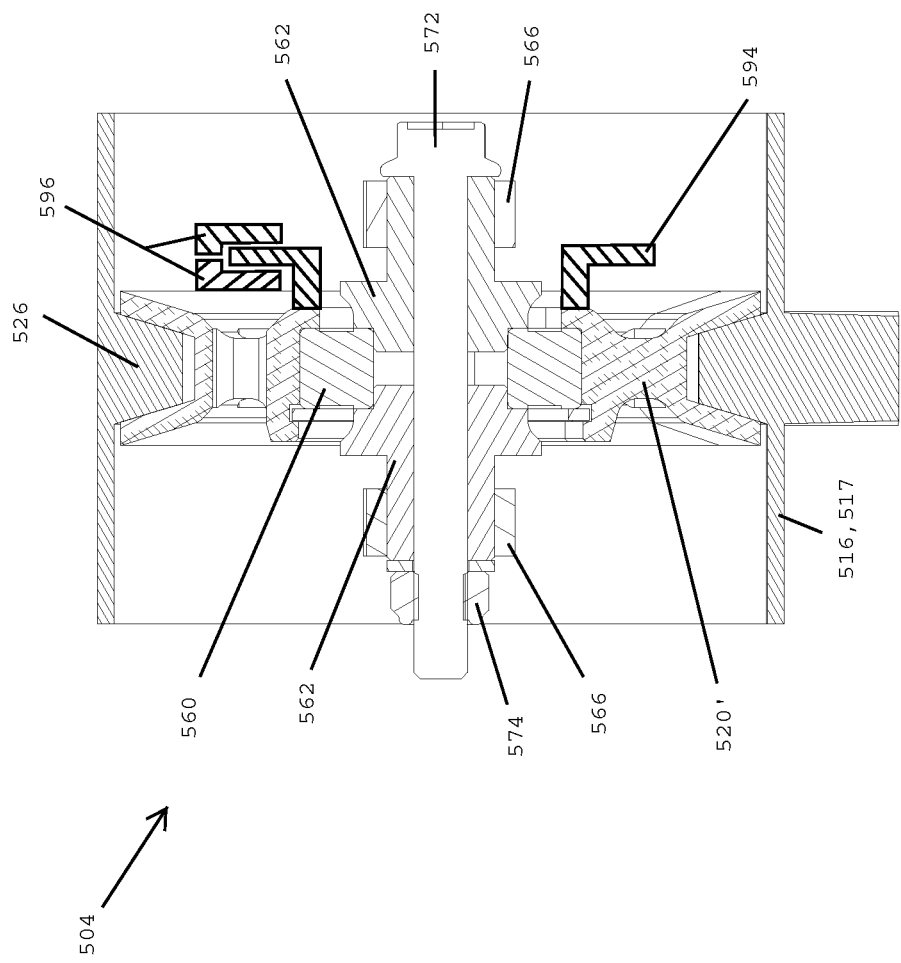
FIG. 36 is a cross-sectional view of the track assembly of FIG. 27 taken through line 35-35 of FIG. 34 having an alternative implementation of a brake assembly.

An alternative implementation of a brake assembly of the track assembly 504 will now be described with respect to FIG. 36. In the illustrated implementation, the pulley 520 has been replaced with a pulley 520' that is similar to the pulley 518 described above. The pulley 520' is constantly in contact with the belt 526. The pulley 520' is mounted to the frame members 508 in the same manner as the pulley 518 described above, and as such is rotatable relative to the frame members 508 and can roll along the inner side of the track body 517. For simplicity, the elements used to mount the pulley 520' to the frame members 508 have been labeled in FIG. 36 with the same numerals as those used to mount the pulley 518 to the frame members 508 and will not be described again. It is contemplated that the pulley 520' could be rotatably mounted to the frame members 508 in other ways. The brake assembly is disposed on a left side of the pulley 520', but it is contemplated that it could be mounted on the right side of the pulley 520'. The brake assembly includes a brake disk 594 connected to the left side of the pulley 520', brake calipers 596 and a hydraulic actuator (not shown) similar to the hydraulic actuator 588 described above. It is contemplated that the brake disk 594 could be integrally formed with the pulley 520'. The brake calipers 596 are disposed on either side of the brake disk 594. The hydraulic actuator is operatively connected to the brake calipers 596 to allow the calipers 596 to squeeze the brake disk 594 therebetween. The hydraulic actuator is operatively connected to the brake lever 26, such that when the driver of the snowmobile 10 actuates the brake lever 26, the brake calipers 596 apply a braking force to the brake disk 594. As a result, the pulley 520' is braked and the resulting friction between the pulley 520' and the belt 526 brakes the track 516. It is contemplated that the hydraulic actuator could be replaced by another type of actuator such as, for example, an electrical actuator. It is also contemplated that the brake assembly could be provided at the front of the track assembly 504 to brake the front pulley 518.

An alternative implementation of the intermediate wheels 522 of the track assembly 504 will now be described with respect to FIG. 37. In the illustrated implementation, the intermediate wheels 522 have been replaced with intermediate wheels 522'. The intermediate wheels 522' have a smaller diameter than the pulleys 518, 520. As such, the intermediate wheels 522' only make contact with the belt 526 at the bottom of the track assembly 504. For simplicity, a connection of only one of the intermediate wheels 522' to the track assembly 504 will be described. The other intermediate wheels 522' are mounted to the track assembly 504 in a similar manner.

As can be seen in FIG. 37, the intermediate wheel 522' is mounted on a bearing 598. A lip of the intermediate wheel 522' and a ring 600 maintain the bearing laterally aligned with the intermediate wheel 522'. The bearing 598 is mounted on and held laterally between a pair of axles 602. As such, the intermediate wheel 522' can rotate about the axles 602. The intermediate wheel 522', the bearing 598, the ring 600, and the axles 602 are disposed inside a housing 604. The housing 604 is disposed laterally between the frame members 508. A bolt 606 passes through the frame members 508, the housing 604 and the axles 602 and has a nut 608 that is fastened on its end to clamp the axles 602 onto the bearing 598 and fasten the axles 602 to the frame members 508. As can be seen, the intermediate wheel 522' contacts and therefore rolls along the top surface the belt 526 as the track 516 turns.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A track assembly for a vehicle comprising:
an endless track having a belt disposed on an inner side thereof;
a frame member;
a ski element connected to the frame member;
a first axle connected to the frame member and disposed at least in part inside the track;
a first pulley disposed inside the endless track and mounted to the first axle, the first pulley being rotatable relative to the frame member, the belt being received in part inside the first pulley;
a second axle connected to the frame member and disposed at least in part inside the track;
a second pulley disposed inside the endless track and mounted to the second axle, the belt being received in part inside the second pulley; and
a brake assembly operatively connected to one of the first and second pulleys.

2. The track assembly of claim 1, further comprising a leg pivotally connected to the frame member.

3. The track assembly of claim 1, wherein the brake assembly is operatively connected to the second pulley.

4. The track assembly of claim 3, wherein the second pulley is rotatable relative to the frame member; and
wherein the brake assembly includes a brake disk and at least one brake caliper, the brake disk being rotationally fixed relative to the second pulley.

5. The track assembly of claim 3, wherein:
the second pulley includes a first sheave portion and a second sheave portion, the belt being received in part between the first and second sheave portions, the first and second sheave portions being selectively movable toward each other; and
the brake assembly is operatively connected to at least one of the first and second sheave portions to selectively move the first and second sheave portions toward each other to squeeze the belt between the first and second sheave portions.

6. The track assembly of claim 5, wherein the brake assembly includes:
a first brake pad selectively abutting the first sheave portion; and
a second brake pad selectively abutting to the second sheave portion.

7. The track assembly of claim 5, wherein the brake assembly includes a hydraulic actuator.

8. The track assembly of claim 5, wherein the second pulley is rotationally fixed relative to the frame member.

9. The track assembly of claim 1, further comprising a housing connected to the frame member; and
wherein the brake assembly is disposed at least in part in the housing.

10. The track assembly of claim 1, wherein the ski element extends at least in part forwardly of the endless track.

11. The track assembly of claim 1, wherein the ski element extends at least in part rearwardly of the endless track.

12. The track assembly of claim 1, wherein the ski element is located at least in part beside at least a portion of a lateral side of the endless track.

13. The track assembly of claim 1, further comprising a handle connected to the ski element.

14. The track assembly of claim 1, wherein the ski element is fixed to the frame member.

15. A snowmobile comprising:
a frame defining a tunnel;
a motor mounted to the frame;
a seat disposed on the tunnel;
a first track assembly disposed under the tunnel and being operatively connected to the motor to be driven by the motor;
a handlebar mounted to the frame at least in part forwardly of the seat; and
at least one second track assembly disposed forwardly of the first track assembly and being operatively connected to the handlebar to be steered by the handlebar, the at least one second track assembly comprising:
an endless track having a belt disposed on an inner side thereof;
a frame member;
a first axle connected to the frame member and disposed at least in part inside the track;
a first pulley disposed inside the endless track and mounted to the first axle, the first pulley being rotatable relative to the frame member, the belt being received in part inside the first pulley;
a second axle connected to the frame member and disposed at least in part inside the track;
a second pulley disposed inside the endless track and mounted to the second axle, the belt being received in part inside the second pulley; and
a brake assembly operatively connected to one of the first and second pulleys.

16. The snowmobile of claim 15, wherein the at least one second track assembly further comprises a leg pivotally connected to the frame member.

17. The snowmobile of claim 15, wherein the brake assembly is operatively connected to the second pulley.

18. The snowmobile of claim 17, wherein the second pulley is rotatable relative to the frame member; and
wherein the brake assembly includes a brake disk and at least one brake caliper, the brake disk being rotationally fixed relative to the second pulley.

19. The snowmobile of claim 17, wherein:
the second pulley includes a first sheave portion and a second sheave portion, the belt being received in part between the first and second sheave portions, the first and second sheave portions being selectively movable toward each other; and
the brake assembly is operatively connected to at least one of the first and second sheave portions to selectively move the first and second sheave portions toward each other to squeeze the belt between the first and second sheave portions.

20. The snowmobile of claim 19, wherein the brake assembly includes:
a first brake pad selectively abutting the first sheave portion; and
a second brake pad selectively abutting to the second sheave portion.

21. The snowmobile of claim 19, wherein the brake assembly includes a hydraulic actuator.

22. The snowmobile of claim 19, wherein the second pulley is rotationally fixed relative to the frame member.

23. The snowmobile of claim 15, wherein the at least one second track assembly further comprises a housing connected to the frame member; and
wherein the brake assembly is disposed at least in part in the housing.

24. The snowmobile of claim 15, wherein the at least one second track assembly further comprises a ski element connected to the frame member.

25. The snowmobile of claim 24, wherein the ski element extends at least in part forwardly of the endless track.

26. The snowmobile of claim 24, wherein the ski element extends at least in part rearwardly of the endless track.

27. The snowmobile of claim 24, wherein the ski element is located at least in part beside at least a portion of a lateral side of the endless track.

28. The snowmobile of claim 24, wherein the at least one second track assembly further comprises a handle connected to the ski element.

29. The snowmobile of claim 24, wherein the ski element is fixed to the frame member.

* * * * *